(12) United States Patent
Fei et al.

(10) Patent No.: US 11,269,186 B2
(45) Date of Patent: Mar. 8, 2022

(54) AUGMENTED REALITY APPARATUS AND METHOD, AND OPTICAL ENGINE COMPONENT

(71) Applicant: Huawei Technologies Co., Ltd., Shenzhen (CN)

(72) Inventors: Yonghao Fei, Helsinki (FI); Houqiang Jiang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 108 days.

(21) Appl. No.: 16/891,671

(22) Filed: Jun. 3, 2020

(65) Prior Publication Data

US 2020/0292830 A1 Sep. 17, 2020

Related U.S. Application Data

(63) Continuation of application No. PCT/CN2018/100658, filed on Aug. 15, 2018.

(30) Foreign Application Priority Data

Dec. 4, 2017 (CN) .......................... 201711262863.6

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 27/286* (2013.01); *G02B 27/288* (2013.01); *G02B 2027/0178* (2013.01)

(58) Field of Classification Search
CPC ........ G02B 1/04; G02B 5/3033; G02B 1/105; G02B 1/14; G02B 5/3083; G02B 5/30; G02B 5/3025; G02B 1/111; G02B 5/3041; G02B 27/283; G02B 27/286; G02B 5/3016; G02B 5/305; G02B 1/02; G02B 1/043; G02B 5/02; G02B 5/0278; G02B 5/3058; G02B 1/10; G02B 2027/0112; G02B 21/14; G02B 27/0006; G02B 27/0101;
(Continued)

(56) References Cited

U.S. PATENT DOCUMENTS 5,596,451 A  1/1997  Handschy et al.
6,693,749 B2  2/2004  King et al.
(Continued)

FOREIGN PATENT DOCUMENTS

CN  1570692 A  1/2005
CN  203385936 U  1/2014
(Continued)

*Primary Examiner* — Collin X Beatty
*Assistant Examiner* — Grant A Gagnon
(74) *Attorney, Agent, or Firm* — Conley Rose, P.C.

(57) ABSTRACT

An augmented reality (AR) apparatus and method, and an optical engine component, where the AR apparatus includes a light-emitting light source, a polarization splitting subsystem, a first image source, a first optical subsystem, and a first combination subsystem. The first optical subsystem includes a first lens group, a first quarter-wave plate, and a first reflection surface. The first optical subsystem is configured to receive second polarized light and output first polarized light to the first combination subsystem. The first combination subsystem is configured to combine the received first polarized light and received external ambient light, and combined light is projected into an eye.

20 Claims, 10 Drawing Sheets

(58) Field of Classification Search
CPC .............. G02B 27/0172; G02B 5/0221; G02B
5/0242; G02B 5/208; G02B 5/32; G02B
19/0028; G02B 19/0057; G02B 1/007;
G02B 1/08; G02B 1/11; G02B 1/118;
G02B 1/12; G02B 1/16; G02B 1/18;
G02B 2027/011; G02B 2027/012; G02B
2027/0125; G02B 2027/0138; G02B
2027/0174; G02B 2027/0178; G02B
21/0032; G02B 2207/101; G02B 23/08;
G02B 23/105; G02B 26/123; G02B
27/0081; G02B 27/01; G02B 27/0103;
G02B 27/0905; G02B 27/0927; G02B
27/0944; G02B 27/0988; G02B 27/1046;
G02B 27/14; G02B 27/142; G02B
27/145; G02B 27/28; G02B 27/281;
G02B 27/285; G02B 27/48; G02B 27/52;
G02B 27/58; G02B 30/25; G02B 30/27;
G02B 3/00; G02B 3/005; G02B 5/008;
G02B 5/0215; G02B 5/0284; G02B 5/04;
G02B 5/045; G02B 5/223; G02B 5/3008;
G02B 5/3075; G02B 6/00; G02B 6/0053;
G02B 6/0065; G02B 6/1226; G02B
6/2726; G02B 6/2793; G02B 6/29397;
G02B 6/32; G02B 6/4203; G02B 6/4206;
G02B 6/4208; G02B 6/4275; G02B
6/4296

USPC ........................................................ 359/485
See application file for complete search history.

(56) References Cited

U.S. PATENT DOCUMENTS

| 7,675,684 | B1 | 3/2010 | Weissman et al. |
| 9,869,862 | B2 | 1/2018 | Cheng et al. |
| 2008/0062519 | A1 | 3/2008 | Facius |
| 2013/0016292 | A1 | 1/2013 | Miao et al. |
| 2013/0135722 | A1 | 5/2013 | Yokoyama |
| 2013/0314793 | A1 | 11/2013 | Robbins et al. |
| 2014/0126057 | A1 | 5/2014 | Amitai et al. |
| 2015/0316780 | A1 | 11/2015 | Zheng et al. |

FOREIGN PATENT DOCUMENTS

| CN | 103620479 | A | 3/2014 |
| CN | 103869467 | A | 6/2014 |
| CN | 203773160 | U | 8/2014 |
| CN | 104460002 | A | 3/2015 |
| CN | 206193432 | U | 5/2017 |
| CN | 107870438 | A | 4/2018 |
| EP | 3133434 | A1 | 2/2017 |

—⊗— First polarized light
—|— Second polarized light

AUGMENTED REALITY APPARATUS AND METHOD, AND OPTICAL ENGINE COMPONENT

CROSS-REFERENCE TO RELATED APPLICATIONS

This application is a continuation of International Patent Application No. PCT/CN2018/100658 filed on Aug. 15, 2018, which claims priority to Chinese Patent Application No. 201711262863.6 filed on Dec. 4, 2017. The disclosures of the aforementioned applications are hereby incorporated by reference in their entireties.

TECHNICAL FIELD

This application relates to the optical field, and in particular, to an augmented reality (AR) apparatus and method, and an optical engine component.

BACKGROUND

With popularization of computing devices in people's life, hardware of the computing device tends to be miniaturized in consideration of portability. In particular, in the image visual processing field, wearable devices such as glasses or a helmet are favored by a user. To improve user experience on a virtual image and a real image, a wearable device is equipped with an AR technology.

The AR technology is a technology in which a virtual object or prompt information generated by a computer or a terminal device is superimposed on a real scenario, to enhance a user's perception of the real world. In the AR technology, real world information and virtual world information are "seamlessly" integrated. To be specific, real information that is difficult to experience in a specific time and space range of the real world, such as visual information, sound, taste, and touch, is simulated and superimposed using technology such as a computer, and then the virtual information is applied to the real world and perceived by human senses in order to achieve a sense experience beyond reality. A typical AR implementation is AR glasses.

The user may view, using the AR glasses, an image obtained after the virtual image and the real image are combined, and the combined image needs to conform to a scene seen by the user's eyes. A field of view (FOV) depends on an angle of view. A larger angle of view indicates a larger FOV. However, a size of the AR glasses limits an angle of view of the AR glasses. A larger size of the AR glasses indicates a larger angle of view of the AR glasses.

SUMMARY

Embodiments of this application provide an AR apparatus and method, which can correspondingly reduce a size of the entire AR apparatus under a condition that a large angle of view is ensured.

The embodiments of this application further provide an optical engine component applied to an AR product, which can correspondingly reduce a size of the entire AR product under a condition that a large angle of view is ensured.

According to a first aspect, an embodiment of this application provides an AR apparatus. The apparatus includes a light-emitting light source, a polarization splitting subsystem, a first image source, a first optical subsystem, and a first combination subsystem, and the first optical subsystem includes a first lens group, a first quarter-wave plate, and a first reflection surface. The light-emitting light source is configured to emit natural light. The polarization splitting subsystem is configured to reflect first polarized light in the incident natural light, and the reflected first polarized light enters the first image source. The first image source is configured to convert (for example, through reflection) the incident first polarized light into second polarized light, and the second polarized light enters the polarization splitting subsystem. The polarization splitting subsystem is further configured to transport (for example, through reflection, transmission, or refraction) the second polarized light to the first optical subsystem. An optical path of the first optical subsystem includes that the second polarized light is transmitted through the first lens group and enters the first quarter-wave plate, and then is transported through the first quarter-wave plate to the first reflection surface, after being reflected by the first reflection surface, the reflected polarized light enters the first quarter-wave plate, and is transported through the first quarter-wave plate to the first lens group, and first polarized light transported through the first quarter-wave plate is transmitted by the first lens group to the polarization splitting subsystem. The polarization splitting subsystem is further configured to reflect the first polarized light, and the reflected first polarized light enters the first combination subsystem. The first combination subsystem is configured to combine the incident first polarized light and incident first external ambient light, and combined light is imaged into an eye.

In an example, a polarization vector of the first polarized light and a polarization vector of the second polarized light are perpendicular to each other. That is, a polarization direction of the first polarized light and a polarization direction of the second polarized light are perpendicular to each other. For example, when the first polarized light is S polarized light, the second polarized light is P polarized light. When the first polarized light is P polarized light, the second polarized light is S polarized light.

It can be learned from the above that, the second polarized light that carries virtual image information is transported to the first optical subsystem, and reaches the first reflection surface after passing through the first lens group and the first quarter-wave plate. The first reflection surface reflects the polarized light that carries the virtual image information such that the polarized light that carries the virtual image information passes through the first quarter-wave plate and the first lens group again. The first optical subsystem implements a round trip of light. That is, for each lens in the first lens group, the polarized light passes through the lens twice in opposite directions. The polarized light that carries the virtual image information and the external ambient light that carries the real image information are imaged into the eye after passing through the combination subsystem. In this technical solution, using a combination of one first lens group and the first reflection surface may achieve an effect of using two lens groups, thereby reducing a quantity of lenses by half. In addition, on the basis of reusing the polarization splitting subsystem and the first lens group, a larger quantity of lenses through which polarized light passes indicates a stronger capability of correcting marginal light, and therefore a larger angle of view of imaging. In this technical solution, the polarized light passes through the first lens group twice, that is, passes through a double quantity of lenses in the first lens group, thereby enlarging an angle of view. Therefore, the size of the entire AR apparatus is correspondingly reduced under a condition that a large angle of view is ensured.

The second polarized light entering the first optical subsystem successively enters the first lens group and the first quarter-wave plate and reaches the first reflection surface. After being transported by the first reflection surface, the second polarized light successively enters the first quarter-wave plate and the first lens group. In this way, a change in polarization state of polarized light caused by small errors in a lens processing process can be reduced, and contrast of an image finally imaged into an eye can be improved. That is, after the second polarized light passes through the quarter-wave plate and is reflected by the first reflection surface, the second polarized light directly enters the first quarter-wave plate again. The shortest round trip results in a better effect, that is, the polarized light is prevented from passing through more components, and a problem that a polarization state changes due to non-ideality (such as roughness and a material refractive index) of the components is avoided.

A size of an image generated based on first polarized light that is reflected by the polarization splitting subsystem and output by the first optical subsystem is too large to be accepted by an eye. The first combination subsystem may combine the received first polarized light that is reflected by the polarization splitting subsystem and output by the first optical subsystem and the first external ambient light in order to ensure a relatively large angle of view of the AR apparatus. For example, the angle of view is greater than 50°. The first combination subsystem may limit light with a relatively large angle of view to relatively small space such that a generated image is reduced in size and focused, sharpness of the image that is imaged into an eye is improved, and distortion of the image is reduced, thereby improving quality of the image that is imaged into an eye as a whole.

In some embodiments of the first aspect, the first lens group includes at least two lenses, some lenses in the first lens group are configured to converge light, and the other lenses in the first lens group are configured to diverge light.

In an example, the first lens group includes a first biconvex lens, a first convex-concave lens, and a second biconvex lens. The second polarized light is transmitted through the first biconvex lens and enters the first convex-concave lens, the second polarized light entering the first convex-concave lens is transmitted through the first convex-concave lens and enters the second biconvex lens, and the second polarized light is transmitted through the second biconvex lens and enters the first quarter-wave plate. The first polarized light transported from the first quarter-wave plate enters the second biconvex lens and is transmitted, the transmitted first polarized light is transmitted through the first convex-concave lens to the first biconvex lens, and the first polarized light is transmitted through the first biconvex lens and enters the polarization splitting subsystem.

In another example, the first lens group includes a third biconvex lens and a second convex-concave lens. The second polarized light is transmitted through the third biconvex lens and enters the second convex-concave lens, and the second polarized light is transmitted through the second convex-concave lens and enters the first quarter-wave plate. The first polarized light transported from the first quarter-wave plate enters the second convex-concave lens and is transmitted, and the first polarized light is transmitted through the third biconvex lens and enters the polarization splitting subsystem.

Light transmitted through the first lens group undergoes convergence, divergence, and convergence. Through light convergence and divergence, optical paths of light beams at a relatively large angle of view are consistent, that is, an optical path difference between light beams is the smallest. In this way, resolution of an image that is finally imaged into an eye is improved, and distortion that may occur in an image transmission process is reduced.

In some embodiments of the first aspect, the polarization splitting subsystem includes a first polarization beam splitter. The first polarization beam splitter is in a shape of a cuboid, and the first polarization beam splitter includes a first polarization beam splitting component located in the middle and four second polarization beam splitting components located around the first polarization beam splitting component, the first polarization beam splitting component is in a shape of a cuboid, the second polarization beam splitting component is in a shape of a triangular prism, and a bottom surface of the second polarization beam splitting component is an isosceles right triangle, each side face of the first polarization beam splitting component is attached to a first side face of a corresponding second polarization beam splitting component, to form a first attached surface and a third attached surface that face each other, and a second attached surface and a fourth attached surface that face each other, and the first side face is a side face corresponding to a right angle at a bottom surface of the second polarization beam splitting component. An optical path of the first polarization beam splitter includes the natural light or the first polarized light in the natural light is incident on a second polarization beam splitting component and reaches the first attached surface, the first polarized light in the natural light is reflected by the first attached surface and reaches the first image source, the first polarized light is reflected by the first image source and becomes second polarized light, and the second polarized light is transmitted through the first attached surface and reaches the fourth attached surface, the fourth attached surface reflects, to the third attached surface, the second polarized light transmitted from the first attached surface, and the second polarized light is transmitted out of the first polarization beam splitter through the third attached surface. The optical path of the first polarization beam splitter further includes that the natural light or the first polarized light in the natural light is incident on a second polarization beam splitting component and reaches the fourth attached surface, the first polarized light in the natural light is transmitted through the fourth attached surface and reaches the third attached surface, the first polarized light is reflected by the third attached surface and reaches the second attached surface, then is transmitted through the second attached surface, and reaches the first image source, the first polarized light is reflected by the first image source and becomes second polarized light, and the second polarized light reaches the second attached surface, and the second polarized light is reflected by the second attached surface out of the first polarization beam splitter.

The first polarization beam splitter may use the four attached surfaces to perform combinations of reflection and transmission on the first polarized light and the second polarized light, to separate the first polarized light from the second polarized light. Therefore, separation between the first polarized light and the second polarized light can be implemented using the first polarization beam splitter (which may also be referred to as a four-channel polarization beam splitter) with a relatively small size. That is, a size of the AR apparatus is further reduced by reusing the first polarization beam splitter.

In some embodiments of the first aspect, the polarization splitting subsystem further includes a first polarizer located between the light-emitting light source and the first polarization beam splitter, and the first polarizer is configured to filter out the second polarized light in the incident natural light, and output the first polarized light in the incident natural light to the first polarization beam splitter.

After the second polarized light in the natural light is filtered out using the first polarizer, impact of the second polarized light carrying no virtual image information on definition of the image generated by the second polarized light that carries the virtual image information can be avoided.

In some embodiments of the first aspect, the apparatus further includes a light reflection module disposed between the light-emitting light source and the polarization splitting subsystem, and the light reflection module is configured to reflect the incident natural light to the polarization splitting subsystem.

In some embodiments of the first aspect, the light reflection module includes a first reflection plate, and the incident natural light is reflected by the first reflection plate and then incident on the polarization splitting subsystem.

To improve quality of an image that is finally imaged into the eye, a light adjustment lens may be further disposed between the first reflection plate and the polarization splitting subsystem. After being reflected by the first reflection plate, the incident natural light is input to the polarization splitting subsystem through the light adjustment lens.

In some embodiments of the first aspect, the polarization splitting subsystem includes a second polarization beam splitter. An optical path of the second polarization beam splitter includes that the natural light or the first polarized light in the natural light is incident on the second polarization beam splitter, the first polarized light in the natural light is reflected by the second polarization beam splitter to the first image source, and the first polarized light is reflected by the first image source and becomes second polarized light, and the second polarized light is transmitted through the second polarization beam splitter.

In some embodiments of the first aspect, the polarization splitting subsystem further includes a second polarizer located between the light reflection module and the second polarization beam splitter, and the second polarizer is configured to filter out the second polarized light in the incident natural light, and output the first polarized light in the incident natural light to the second polarization beam splitter.

After the second polarized light in the natural light is filtered out using the second polarizer, impact of the second polarized light carrying no virtual image information on definition of the image generated by the second polarized light that carries the virtual image information can be avoided.

In some embodiments of the first aspect, the apparatus further includes a second image source, a second optical subsystem, and a second combination subsystem, a structure of the second optical subsystem is the same as or symmetric with a structure of the first optical subsystem, the second optical subsystem includes a second lens group, a second quarter-wave plate, and a second reflection surface, and a structure of the second combination subsystem is the same as or symmetric with a structure of the first combination subsystem. The polarization splitting subsystem is further configured to reflect second polarized light in the incident natural light, and the reflected second polarized light enters the second image source. The second image source is configured to convert (for example, through reflection) the incident second polarized light into first polarized light, and the first polarized light enters the polarization splitting subsystem. The polarization splitting subsystem is further configured to transport (for example, through reflection, transmission, or refraction) the first polarized light to the second optical subsystem. An optical path of the second optical subsystem includes that the first polarized light is transmitted through the second lens group and enters the second quarter-wave plate, and then is transported through the second quarter-wave plate to the second reflection surface, after being reflected by the second reflection surface, the reflected polarized light enters the second quarter-wave plate, and is transported through the second quarter-wave plate to the second lens group, and second polarized light transported through the second quarter-wave plate is transmitted by the second lens group to the polarization splitting subsystem. The polarization splitting subsystem is further configured to reflect the second polarized light, and the reflected second polarized light enters the second combination subsystem. The second combination subsystem is configured to combine the incident second polarized light and incident second external ambient light, and combined light is imaged into an eye.

It should be noted that, the first external ambient light may partially overlap the second external ambient light, or the first external ambient light may completely overlap the second external ambient light, which is not limited in the embodiments of this application.

The polarization splitting subsystem splits natural light into first polarized light and second polarized light, introduces, to the first optical subsystem, the second polarized light obtained after the first polarized light is reflected by the first image source, and inputs the first polarized light output by the first optical subsystem to the first combination subsystem, and introduces, to the second optical subsystem, the first polarized light that is obtained after the second polarized light is reflected by the second image source, and inputs, to the second optical subsystem, the second polarized light that is output by the second optical subsystem. Therefore, binocular imaging with AR is implemented. In addition, in this application, the polarization splitting subsystem is shared in the AR apparatus that is applied to both eyes, and the polarization splitting subsystem does not need to be separately disposed for each eye such that the size of the AR apparatus is further reduced. In addition, the first polarized light and the second polarized light are separately used such that a light loss is reduced.

In some embodiments of the first aspect, the second lens group includes at least two lenses, some lenses in the second lens group are configured to converge light, and the other lenses in the second lens group are configured to diverge light.

In an example, the second lens group includes a fourth biconvex lens, a third convex-concave lens, and a fifth biconvex lens. The first polarized light is transmitted through the fourth biconvex lens and enters the third convex-concave lens, the first polarized light entering the third convex-concave lens is transmitted through the third convex-concave lens and enters the fifth biconvex lens, and the first polarized light is transmitted through the fifth biconvex lens and enters the second quarter-wave plate. The second polarized light transported from the first quarter-wave plate enters the fifth biconvex lens and is transmitted, the transmitted second polarized light is transmitted through the third convex-concave lens to the fourth biconvex lens, and the second polarized light is transmitted through the fourth biconvex lens and enters the polarization splitting subsystem.

In another example, the second lens group includes a sixth biconvex lens and a fourth convex-concave lens. The first polarized light is transmitted through the sixth biconvex lens and enters the fourth convex-concave lens, and the first polarized light is transmitted through the fourth convex-concave lens and enters the first quarter-wave plate. The second polarized light transmitted from the first quarter-wave plate enters the fourth convex-concave lens and is transmitted, and the first polarized light is transmitted through the sixth biconvex lens and enters the polarization splitting subsystem.

Light transmitted through the second lens group undergoes convergence, divergence, and convergence. Through light convergence and divergence, optical paths of light beams at a relatively large angle of view are consistent, that is, an optical path difference between light beams is the smallest. In this way, resolution of an image that is finally imaged into eyes is improved, and distortion that may occur in an image transmission process is reduced.

In some embodiments of the first aspect, the polarization splitting subsystem includes an input light reflection surface, a third polarization beam splitter, a fourth polarization beam splitter, a fifth polarization beam splitter, a first polarized light reflection surface, and a second polarized light reflection surface, where the first polarized light reflection surface and the second polarized light reflection surface are symmetrically disposed. After being reflected by the input light reflection surface, the natural light is input to the third polarization beam splitter, the third polarization beam splitter splits the light reflected by the input light reflection surface into first polarized light and second polarized light, the first polarized light is reflected and output by the first polarized light reflection surface, and the second polarized light is reflected and output by the second polarized light reflection surface. The first polarized light output by the first polarized light reflection surface is reflected by the fourth polarization beam splitter to the first image source, the first image source reflects, to the fourth polarization beam splitter, second polarized light converted (for example, through reflection) from the incident first polarized light, and the second polarized light obtained after conversion by the first image source passes through the fourth polarization beam splitter and enters the first optical subsystem. The second polarized light output by the second polarized light reflection surface is reflected by the fifth polarization beam splitter to the second image source, the second image source reflects, to the fifth polarization beam splitter, first polarized light converted (for example, through reflection) from the incident second polarized light, and the first polarized light obtained after conversion by the second image source passes through the fifth polarization beam splitter and enters the second optical subsystem.

In some embodiments of the first aspect, the polarization splitting subsystem includes a sixth polarization beam splitter, a second reflection plate, a seventh polarization beam splitter, and an eighth polarization beam splitter. The natural light is incident on the sixth polarization beam splitter, the first polarized light in the natural light is reflected by the sixth polarization beam splitter to the seventh polarization beam splitter, the seventh polarization beam splitter reflects, to the first image source, the first polarized light reflected by the sixth polarization beam splitter, the first image source converts the first polarized light into second polarized light, and the second polarized light obtained after conversion by the first image source is transmitted through the seventh polarization beam splitter and reaches the first optical subsystem. The second polarized light in the natural light is transmitted to the second reflection plate through the sixth polarization beam splitter, the second reflection plate reflects, to the eighth polarization beam splitter, the second polarized light transmitted from the sixth polarization beam splitter, the eighth polarization beam splitter reflects, to the second image source, the second polarized light reflected from the second reflection plate, the second image source converts the second polarized light into first polarized light, and the first polarized light obtained after conversion by the second image source is transmitted through the eighth polarization beam splitter and reaches the second optical subsystem.

In some embodiments of the first aspect, the polarization splitting subsystem further includes a lens group disposed between the sixth polarization beam splitter and the second reflection plate, and the lens group is configured to slightly adjust light field distribution.

The lens group is added between the sixth polarization beam splitter and the second reflection plate to slightly adjust the light field distribution in order to ensure intensity consistency between light reaching the left eye and light reaching the right eye.

In some embodiments of the first aspect, the apparatus further includes a light homogenization subsystem located between the light-emitting light source and the polarization splitting subsystem. The light homogenization subsystem is configured to process the natural light emitted by the light-emitting light source into homogeneous mixed-color natural light.

A light homogenization system may mix and homogenize red green blue (RGB) three-color light and output homogeneous mixed-color light in order to improve quality of an image that is imaged into an eye and avoid chromatic aberration. In an example, the light homogenization subsystem and the polarization splitting subsystem are shared such that a system size can be reduced by 20%, and optical efficiency can be improved by more than 30%.

In some embodiments of the first aspect, the apparatus further includes a beam expansion subsystem located between the light-emitting light source and the polarization splitting subsystem. The beam expansion subsystem is configured to expand a light spot of the natural light emitted by the light-emitting light source such that the light spot reaches the polarization splitting subsystem.

In some embodiments of the first aspect, the apparatus further includes a beam expansion subsystem located between the light homogenization subsystem and the polarization splitting subsystem. The beam expansion subsystem is configured to expand a light spot of the homogeneous mixed-color natural light such that the light spot reaches the polarization splitting sub system.

To reduce the size of the AR apparatus, generally a size of the light-emitting light source or the light homogenization subsystem is relatively small. A light spot of natural light or homogeneous mixed-color natural light is also relatively small, and the light spot cannot reach the polarization splitting subsystem, or incident light spots are too small, and cannot be evenly distributed in the polarization splitting subsystem. The beam expansion subsystem may expand the light spot such that the light spot reaches the polarization splitting subsystem in order to implement subsequent light transport and imaging.

In some embodiments of the first aspect, the first combination subsystem includes a first beam splitter and a first combination surface. After entering the first beam splitter, the incident first polarized light is reflected to the first combination surface, the first external ambient light is incident on the first combination surface, and is combined with the first polarized light, and the combined light is imaged into the eye after being transmitted through the first beam splitter.

In some embodiments of the first aspect, the first combination subsystem includes a second beam splitter, a second combination surface, and a first waveguider. After entering the second beam splitter, the incident first polarized light is reflected to the second combination surface, the first external ambient light is incident on the second combination surface, and is combined with the first polarized light, and after the combined light enters the waveguider through the second beam splitter, the combined light is imaged into the eye.

In some embodiments of the first aspect, the second combination subsystem includes a third beam splitter and a third combination surface. After entering the third beam splitter, the incident second polarized light is reflected to the third combination surface, the second external ambient light is incident on the third combination surface, and is combined with the second polarized light, and the combined light is imaged into the eye after being transmitted through the first beam splitter.

In some embodiments of the first aspect, the second combination subsystem includes a fourth beam splitter, a fourth combination surface, and a second waveguider. After entering the fourth beam splitter, the incident second polarized light is reflected to the fourth combination surface, the second external ambient light is incident on the fourth combination surface, and is combined with the second polarized light, and after the combined light enters the second waveguider through the fourth beam splitter, the combined light is imaged into the eye.

It can be learned that, on the basis of effectively expanding the FOV using the combination of the first lens group and the first reflection surface, in this embodiment of this application, the first combination subsystem or the second combination subsystem that matches the FOV that is effectively expanded using the combination of the first lens group and the first reflection surface is further selected in order to ensure that a virtual image in an image generated after imaging into an eye matches a real image, and further improve quality of the image that is imaged into the eye.

According to a second aspect, this application provides an optical engine component applied to an AR product. The optical engine component includes a light-emitting light source, a polarization splitting subsystem, a first image source, and a first optical subsystem, and the first optical subsystem includes a first lens group, a first quarter-wave plate, and a first reflection surface. The light-emitting light source is configured to emit natural light. The polarization splitting subsystem is configured to reflect first polarized light in the incident natural light, and the reflected first polarized light enters the first image source. The first image source is configured to convert the incident first polarized light into second polarized light, and the second polarized light enters the polarization splitting subsystem. The polarization splitting subsystem is further configured to transport the second polarized light to the first optical subsystem. An optical path of the first optical subsystem includes that the second polarized light is transmitted through the first lens group and enters the first quarter-wave plate, and then is transported through the first quarter-wave plate to the first reflection surface, after being reflected by the first reflection surface, the reflected polarized light enters the first quarter-wave plate, and is transported through the first quarter-wave plate to the first lens group, and first polarized light transported through the first quarter-wave plate is transmitted by the first lens group to the polarization splitting subsystem. The polarization splitting subsystem is further configured to reflect the first polarized light.

It can be learned from the above that, the second polarized light that carries virtual image information is transported to the first optical subsystem, and reaches the first reflection surface after passing through the first lens group and the first quarter-wave plate. The first reflection surface reflects the polarized light that carries the virtual image information such that the polarized light that carries the virtual image information passes through the first quarter-wave plate and the first lens group again. The first optical subsystem implements a round trip of light. That is, for each lens in the first lens group, the polarized light passes through the lens twice in opposite directions. The polarized light that carries the virtual image information and the external ambient light that carries the real image information are imaged into the eye after passing through the combination subsystem. In this technical solution, using a combination of one first lens group and the first reflection surface may achieve an effect of using two lens groups, thereby reducing a quantity of lenses by half. In addition, on the basis of reusing the polarization splitting subsystem and the first lens group, a larger quantity of lenses through which polarized light passes indicates a stronger capability of correcting marginal light, and therefore a larger angle of view of imaging. In this technical solution, the polarized light passes through the first lens group twice, that is, passes through a double quantity of lenses in the first lens group, thereby enlarging an angle of view. Therefore, a size of the optical engine component (also referred to as an optical machine) is correspondingly reduced under a condition that a large angle of view is ensured, for example, a size of the optical machine is reduced by more than 30%. That is, on the basis of reusing the polarization splitting subsystem and the first lens group, a round trip of light is implemented, and an effect of miniaturization of the optical engine component (also referred to as an optical machine) is achieved.

In some embodiments of the second aspect, the first lens group includes at least two lenses, some lenses in the first lens group are configured to converge light, and the other lenses in the first lens group are configured to diverge light.

In some embodiments of the second aspect, the polarization splitting subsystem includes a first polarization beam splitter. The first polarization beam splitter is in a shape of a cuboid, and the first polarization beam splitter includes a first polarization beam splitting component located in the middle and four second polarization beam splitting components located around the first polarization beam splitting component, the first polarization beam splitting component is in a shape of a cuboid, the second polarization beam splitting component is in a shape of a triangular prism, and a bottom surface of the second polarization beam splitting component is an isosceles right triangle, each side face of the first polarization beam splitting component is attached to a first side face of a corresponding second polarization beam splitting component, to form a first attached surface and a third attached surface that face each other, and a second attached surface and a fourth attached surface that face each other, and the first side face is a side face corresponding to a right angle at a bottom surface of the second polarization beam splitting component. An optical path of the first polarization beam splitter includes the natural light or the first polarized light in the natural light is incident on a second polarization beam splitting component and reaches the first attached surface, the first polarized light in the natural light is reflected by the first attached surface and reaches the first image source, the first polarized light is reflected by the first image source and becomes second polarized light, and the second polarized light is transmitted through the first attached surface and reaches the fourth attached surface, the fourth attached surface reflects, to the third attached surface, the second polarized light transmitted from the first attached surface, and the second polarized light is transmitted out of the first polarization beam splitter through the third attached surface. The optical path of the first polarization beam splitter further includes the natural light or the first polarized light in the natural light is incident on a second polarization beam splitting component and reaches the fourth attached surface, the first polarized light in the natural light is transmitted through the fourth attached surface and reaches the third attached surface, the first polarized light is reflected by the third attached surface and reaches the second attached surface, then is transmitted through the second attached surface, and reaches the first image source, the first polarized light is reflected by the first image source and becomes second polarized light, and the second polarized light reaches the second attached surface, and the second polarized light is reflected by the second attached surface out of the first polarization beam splitter.

In some embodiments of the second aspect, the optical engine component further includes a second image source and a second optical subsystem, a structure of the second optical subsystem is the same as or symmetric with a structure of the first optical subsystem, and the second optical subsystem includes a second lens group, a second quarter-wave plate, and a second reflection surface. The polarization splitting subsystem is further configured to reflect second polarized light in the incident natural light, and the reflected second polarized light enters the second image source. The second image source is configured to convert the incident second polarized light into first polarized light, and the first polarized light enters the polarization splitting subsystem. The polarization splitting subsystem is further configured to transport the first polarized light to the second optical subsystem. An optical path of the second optical subsystem includes that the first polarized light is transmitted through the second lens group and enters the second quarter-wave plate, and then is transported through the second quarter-wave plate to the second reflection surface, after being reflected by the second reflection surface, the reflected polarized light enters the second quarter-wave plate, and is transported through the second quarter-wave plate to the second lens group, and second polarized light transported through the second quarter-wave plate is transmitted by the second lens group to the polarization splitting subsystem. The polarization splitting subsystem is further configured to reflect the second polarized light.

In some embodiments of the second aspect, the second lens group includes at least two lenses, some lenses in the second lens group are configured to converge light, and the other lenses in the second lens group are configured to diverge light.

In some embodiments of the second aspect, the polarization splitting subsystem includes an input light reflection surface, a third polarization beam splitter, a fourth polarization beam splitter, a fifth polarization beam splitter, a first polarized light reflection surface, and a second polarized light reflection surface, where the first polarized light reflection surface and the second polarized light reflection surface are symmetrically disposed. After being reflected by the input light reflection surface, the natural light is input to the third polarization beam splitter, the third polarization beam splitter splits the light reflected by the input light reflection surface into first polarized light and second polarized light, the first polarized light is reflected and output by the first polarized light reflection surface, and the second polarized light is reflected and output by the second polarized light reflection surface. The first polarized light output by the first polarized light reflection surface is reflected by the fourth polarization beam splitter to the first image source, the first image source reflects, to the fourth polarization beam splitter, second polarized light converted (for example, through reflection) from the incident first polarized light, and the second polarized light obtained after conversion by the first image source passes through the fourth polarization beam splitter and enters the first optical subsystem. The second polarized light output by the second polarized light reflection surface is reflected by the fifth polarization beam splitter to the second image source, the second image source reflects, to the fifth polarization beam splitter, first polarized light converted from the incident second polarized light, and the first polarized light obtained after conversion by the second image source passes through the fifth polarization beam splitter and enters the second optical subsystem.

In some embodiments of the second aspect, the polarization splitting subsystem includes a sixth polarization beam splitter, a second reflection plate, a seventh polarization beam splitter, and an eighth polarization beam splitter. The natural light is incident on the sixth polarization beam splitter, the first polarized light in the natural light is reflected by the sixth polarization beam splitter to the seventh polarization beam splitter, the seventh polarization beam splitter reflects, to the first image source, the first polarized light reflected by the sixth polarization beam splitter, the first image source converts the first polarized light into second polarized light, and the second polarized light obtained after conversion by the first image source is transmitted through the seventh polarization beam splitter and reaches the first optical subsystem. The second polarized light in the natural light is transmitted to the second reflection plate through the sixth polarization beam splitter, the second reflection plate reflects, to the eighth polarization beam splitter, the second polarized light transmitted from the sixth polarization beam splitter, the eighth polarization beam splitter reflects, to the second image source, the second polarized light reflected from the second reflection plate, the second image source converts the second polarized light into first polarized light, and the first polarized light obtained after conversion by the second image source is transmitted through the eighth polarization beam splitter and reaches the second optical subsystem.

It should be understood that for beneficial effects achieved in the second aspect and the corresponding embodiments of this application, refer to beneficial effects achieved in the first aspect and the corresponding feasible design manners of this application. Details are not described again.

According to a third aspect, this application provides an AR method. The method includes emitting, by a light-emitting light source, natural light, reflecting, by a polarization splitting subsystem, first polarized light in the incident natural light, where the reflected first polarized light enters a first image source, converting (for example, through reflection), by the first image source, the incident first polarized light into second polarized light, where the second polarized light enters the polarization splitting subsystem, transporting (for example, through reflection, transmission, or refraction), by the polarization splitting subsystem, the second polarized light to a first lens group, transmitting the incident second polarized light through the first lens group to a first quarter-wave plate, processing, by the first quarter-wave plate, the transmitted second polarized light into polarized light, and transporting the polarized light to a first reflection surface, reflecting, by the first reflection surface, the incident polarized light to the first quarter-wave plate, processing, by the first quarter-wave plate, the incident polarized light into first polarized light, and transporting the first polarized light to the first lens group, transmitting, by the first lens group, the incident first polarized light to the polarization splitting subsystem, reflecting, by the polarization splitting subsystem, the incident first polarized light, where the reflected first polarized light enters a first combination subsystem, and combining, by the first combination subsystem, the incident first polarized light and incident first external ambient light, where combined light is imaged into an eye.

The second polarized light that carries virtual image information is transported to the first optical subsystem, and reaches the first reflection surface after passing through the first lens group and the first quarter-wave plate. The first reflection surface reflects the polarized light that carries the virtual image information such that the polarized light that carries the virtual image information passes through the first quarter-wave plate and the first lens group again. The first optical subsystem implements a round trip of light. That is, for each lens in the first lens group, the polarized light passes through the lens twice in opposite directions. The polarized light that carries the virtual image information and the external ambient light that carries the real image information are imaged into the eye after passing through the combination subsystem. In this technical solution, using a combination of one first lens group and the first reflection surface may achieve an effect of using two lens groups, thereby reducing a quantity of lenses by half. In addition, on the basis of reusing the polarization splitting subsystem and the first lens group, a larger quantity of lenses through which polarized light passes indicates a stronger capability of correcting marginal light, and therefore a larger angle of view of imaging. In this technical solution, the polarized light passes through the first lens group twice, that is, passes through a double quantity of lenses in the first lens group, thereby enlarging an angle of view. Therefore, the size of the entire AR apparatus is correspondingly reduced under a condition that a large angle of view is ensured.

The second polarized light entering the first optical subsystem successively enters the first lens group and the first quarter-wave plate and reaches the first reflection surface. After being transported by the first reflection surface, the second polarized light successively enters the first quarter-wave plate and the first lens group. In this way, a change in polarization state of polarized light caused by small errors in a lens processing process can be reduced, and contrast of an image finally imaged into an eye can be improved. That is, after the second polarized light passes through the quarter-wave plate and is reflected by the first reflection surface, the second polarized light directly enters the first quarter-wave plate again. The shortest round trip results in a better effect, that is, the polarized light is prevented from passing through more components, and a problem that a polarization state slightly changes due to non-ideality (such as roughness and a material refractive index) of the components is avoided.

A size of an image generated based on first polarized light that is reflected by the polarization splitting subsystem and output by the first optical subsystem is too large to be accepted by an eye. The first combination subsystem may combine the received first polarized light that is reflected by the polarization splitting subsystem and output by the first optical subsystem in order to ensure a relatively large angle of view of the AR apparatus. For example, the angle of view is greater than 50°. The first combination subsystem may limit light with a relatively large angle of view to relatively small space such that a generated image is reduced in size and focused, sharpness of the image that is imaged into an eye is improved, and distortion of the image is reduced, thereby improving quality of the image that is imaged into an eye as a whole.

In some embodiments of the second aspect, the AR method further includes reflecting, by the polarization splitting subsystem, second polarized light in the incident natural light, where the reflected second polarized light enters a second image source, converting (for example, through reflection), by the second image source, the incident second polarized light into first polarized light, where the first polarized light enters the polarization splitting subsystem, transporting, by the polarization splitting subsystem, the first polarized light to a second lens group, transmitting the incident first polarized light through the second lens group to a second quarter-wave plate, processing, by the second quarter-wave plate, the incident first polarized light into polarized light, and transporting the polarized light to a second reflection surface, reflecting, by the second reflection surface, the incident polarized light to the second quarter-wave plate, processing, by the second quarter-wave plate, the incident polarized light into second polarized light, and transporting the second polarized light to the second lens group, transmitting, by the second lens group, the incident second polarized light to the polarization splitting subsystem, reflecting, by the polarization splitting subsystem, the incident second polarized light, where the reflected second polarized light enters a second combination subsystem, and combining, by the second combination subsystem, the incident second polarized light and incident second external ambient light, where combined light is imaged into an eye.

The polarization splitting subsystem splits the natural light into the first polarized light and the second polarized light, introduces, to the first optical subsystem, the second polarized light obtained after the first polarized light is converted by the first image source, and inputs the first polarized light output by the first optical subsystem to the first combination subsystem, and introduces, to the second optical subsystem, the first polarized light that is obtained after the second polarized light is converted by the second image source, and inputs, to the second optical subsystem, the second polarized light that is output by the second optical subsystem. Therefore, binocular imaging with AR is implemented. In addition, in this application, the polarization splitting subsystem is shared in the AR apparatus that is applied to both eyes, and the polarization splitting subsystem does not need to be separately disposed for each eye such that the size of the AR apparatus is reduced. In addition, the first polarized light and the second polarized light are separately used such that a light loss is reduced.

BRIEF DESCRIPTION OF DRAWINGS

This application can be better understood from the following description of specific implementations of this application with reference to the accompanying drawings, and the same or similar reference numerals indicate the same or similar features.

DESCRIPTION OF EMBODIMENTS

The embodiments of this application provide an AR apparatus. The AR apparatus can split natural light into first polarized light and/or second polarized light. A polarization vector of the first polarized light and a polarization vector of the second polarized light may be perpendicular to each other. For example, when the first polarized light is S polarized light, the second polarized light is P polarized light. When the first polarized light is P polarized light, the second polarized light is S polarized light. A polarization vector of S polarized light is perpendicular to a paper surface, and a polarization vector of P polarized light is parallel to the paper surface. After passing through an image source, the first polarized light and/or the second polarized light become polarized light that carries image information. A transport path of the polarized light is implemented as a round trip such that transporting the polarized light using one lens group can achieve an effect of transporting light through two lens groups. Therefore, a quantity of lenses disposed in the AR apparatus is reduced, and a size of the AR apparatus is reduced.

The AR apparatus in the embodiments of this application may be further implemented as AR glasses, an AR helmet, or the like. The following describes a specific structure of the AR apparatus.

Figure 1:
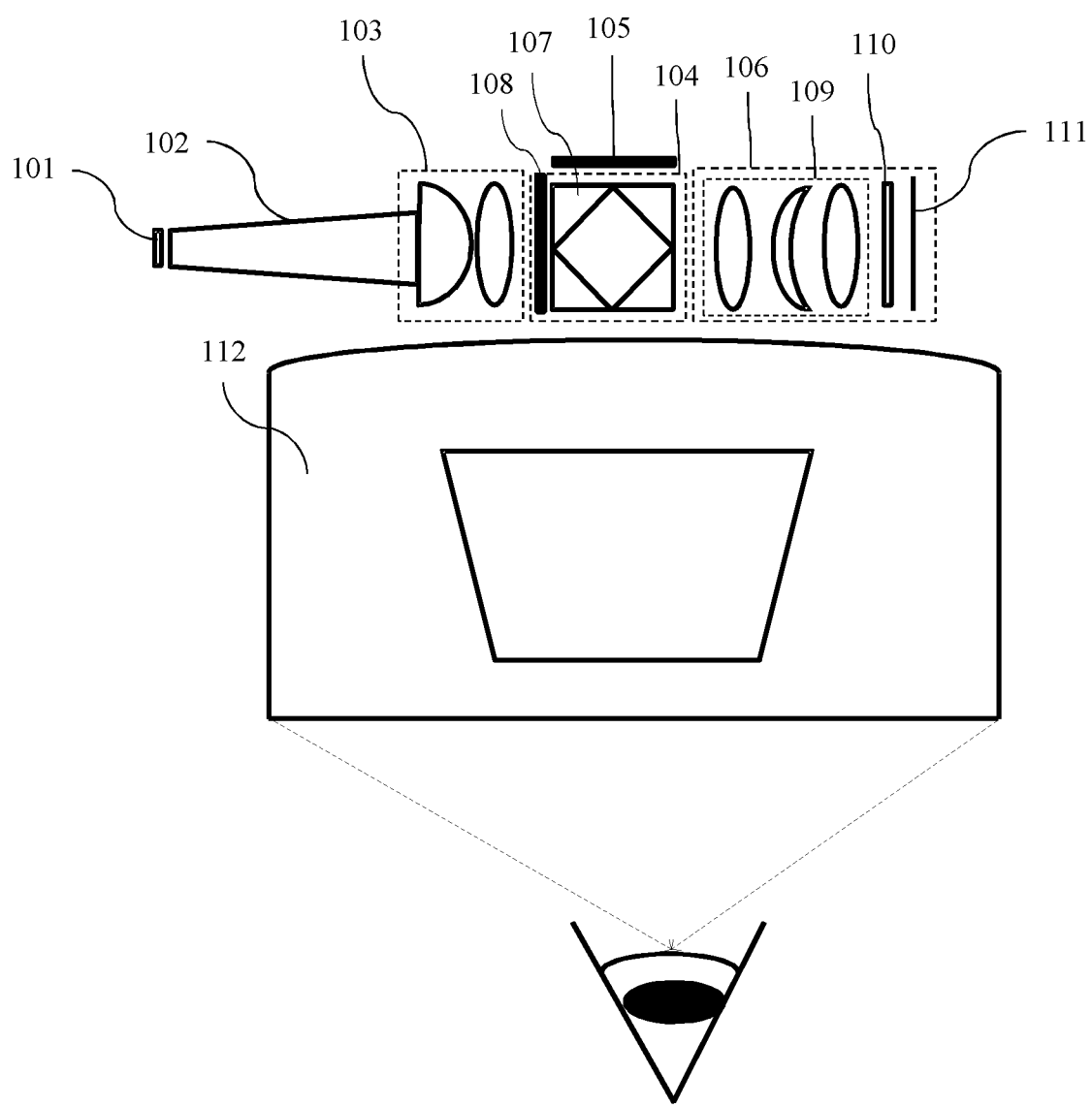
FIG. 1 is a schematic structural diagram of an AR apparatus according to an embodiment of this application.

FIG. 1 is a schematic structural diagram of an AR apparatus according to an embodiment of this application. As shown in FIG. 1, the AR apparatus includes a light-emitting light source 101, a polarization splitting subsystem 104, a first image source 105, a first optical subsystem 106, and a first combination subsystem 112. The first optical subsystem 106 includes a first lens group 109, a first quarter-wave plate 110, and a first reflection surface 111. It should be noted that a position of the first lens group 109 and a position of the first quarter-wave plate 110 may be exchanged. That is, the first optical subsystem 106 may include the first quarter-wave plate 110, the first lens group 109, and the first reflection surface 111 that are arranged from left to right.

The light-emitting light source 101 is configured to emit natural light. The light-emitting light source 101 may be a light source that emits natural light, such as a light-emitting diode (LED) light source, a laser diode light source, or an organic LED (OLED) light source. For example, the LED light source may be a small light source that includes one LED, or an array light source that includes a plurality of LEDs. The light-emitting light source may be alternatively a light emitting panel, for example, a panel with LED backlight or a panel with OLED backlight. The light-emitting light source may be a light source that emits collimated light, or a light source that emits divergent light. The light source may be provided with a collimated-light conversion component to convert divergent light into collimated light in order to improve quality of an image that is finally imaged into an eye.

The polarization splitting subsystem 104 is configured to reflect first polarized light in incident natural light, and the reflected first polarized light enters the first image source 105. It should be understood that natural light emitted by the light-emitting light source 101 may be all incident on the polarization splitting subsystem 104, or partially incident on the polarization splitting subsystem 104. This is not limited in this embodiment of this application.

Figure 2:
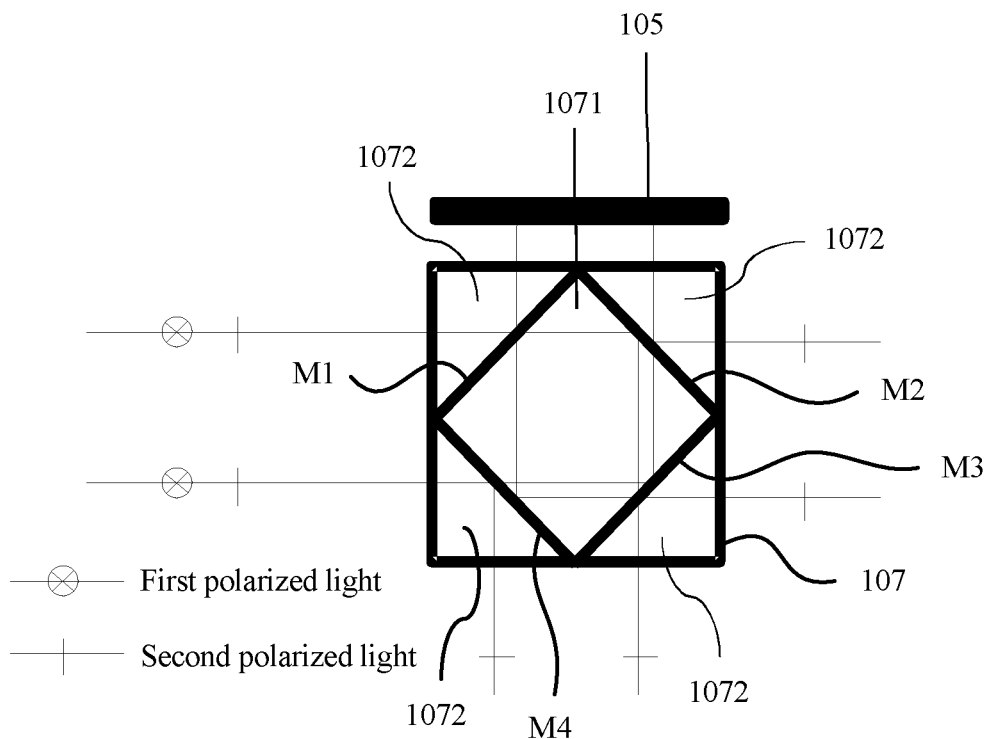
FIG. 2 is a schematic diagram of an optical path of a first polarization beam splitter according to an embodiment of this application.

As shown in FIG. 1 and FIG. 2, the polarization splitting subsystem 104 may include a first polarization beam splitter 107 (which may also be referred to as a four-channel polarization beam splitter). As shown in FIG. 2, the first polarization beam splitter 107 is in a shape of a cuboid, and may include a first polarization beam splitting component 1071 located in the middle and four second polarization beam splitting components 1072 located around the first polarization beam splitting component 1071. The first polarization beam splitting component 1071 is in a shape of a cuboid, the second polarization beam splitting component 1072 is in a shape of a triangular prism, and a bottom surface of the second polarization beam splitting component 1072 is an isosceles right triangle. Each side face of the first polarization beam splitting component 1071 is attached to a first side face of a corresponding second polarization beam splitting component 1072, to form a first attached surface M1 and a third attached surface M3 that face each other, and a second attached surface M2 and a fourth attached surface M4 that face each other. The first side face is a side face corresponding to a right angle at a bottom surface of the second polarization beam splitting component 1072. FIG. 1 shows a cross-sectional view of the first polarization beam splitter 107.

FIG. 2 is a schematic diagram of an optical path of the first polarization beam splitter 107 according to an embodiment of this application. Light incident on the first polarization beam splitter 107 in FIG. 2 includes first polarized light and second polarized light. For example, when the first polarized light is S polarized light, the second polarized light is P polarized light. When the first polarized light is P polarized light, the second polarized light is S polarized light. Light may be incident from the first attached surface M1 and the fourth attached surface M4 of the first polarization beam splitter 107. If the light is incident from the first attached surface M1, the natural light enters the second polarization beam splitting component 1072 and reaches the first attached surface M1. First polarized light in the natural light is reflected by the first attached surface M1, and reaches the first image source 105. The first polarized light is reflected by the first image source 105 and becomes second polarized light, and the second polarized light is transmitted through the first attached surface M1 and reaches the fourth attached surface M4. It should be noted that a polarization vector of the first polarized light changes after the first polarized light is reflected by the first image source 105, and the first polarized light is converted into the second polarized light, where the second polarized light generated after the reflection by the first image source 105 carries virtual image information. The second polarized light transmitted from the first attached surface M1 is reflected by the fourth attached surface M4 to the third attached surface M3, and is transmitted through the third attached surface M3 and then transported rightward out of the first polarization beam splitter 107. That is, the second polarized light transported rightward out of the first polarization beam splitter 107 carries the virtual image information.

Second polarized light in the natural light is transmitted through the first attached surface M1, and reaches the second attached surface M2. The second polarized light is reflected by the second attached surface M2, reaches the third attached surface M3, then is transmitted through the third attached surface M3, and is finally transported downward out of the first polarization beam splitter 107. Because the second polarized light in the natural light does not pass through the first image source 105, the second polarized light transported downward from the first polarization beam splitter 107 carries no virtual image information. In addition, the second polarized light carrying no virtual image information does not change content of an image generated by the second polarized light that carries the virtual image information.

If the light is incident on the fourth attached surface M4, the natural light enters the second polarization beam splitting component 1072 and reaches the fourth attached surface M4. First polarized light in the natural light is transmitted through the fourth attached surface M4 and reaches the third attached surface M3, then is reflected by the third attached surface M3 and reaches the second attached surface M2, and is transmitted through the second attached surface M2 and reaches the first image source 105. The first polarized light is reflected by the first image source 105 and becomes second polarized light. The second polarized light reaches the second attached surface M2, and is reflected by the second attached surface M2 and then transported rightward out of the first polarization beam splitter 107. It should be noted that the second polarized light generated after the reflection by the first image source 105 carries virtual image information. The second polarized light transported rightward out of the first polarization beam splitter 107 carries the virtual image information.

Second polarized light in the natural light is reflected by the fourth attached surface M4, and is transported downward out of the first polarization beam splitter 107. Because the second polarized light in the natural light does not pass through the first image source 105, the second polarized light transported downward out of the first polarization beam splitter 107 carries no virtual image information. The second polarized light carrying no virtual image information does not change content of an image generated by the second polarized light that carries the virtual image information.

To further improve definition of an image that is finally imaged into an eye, the second polarized light carrying no virtual image information may be filtered out in advance. A first polarizer 108 may be added between the light-emitting light source 101 and the first polarization beam splitter 107. The first polarizer 108 may filter out the second polarized light in the natural light and output the first polarized light in the natural light to the first polarization beam splitter 107. After the second polarized light in the natural light is filtered out, impact of the second polarized light carrying no virtual image information on definition of the image generated by the second polarized light that carries the virtual image information can be avoided.

The first polarization beam splitter 107 may also be a polarization beam splitter with another structure that can transport the second polarized light carrying the virtual image information to the first optical subsystem 106, and is not limited to the foregoing structure. For example, the first polarization beam splitter 107 may be alternatively a polarization beam splitter that includes only the first polarization beam splitting component 1071. Shapes and a quantity of polarization beam splitting components in the first polarization beam splitter 107 may be changed or an optical film may be added, and a polarization beam splitter that can transport second polarized light carrying virtual image information to the first optical subsystem 106 falls within the protection scope of this application.

It can be learned from the above that the first polarization beam splitter (which may also be referred to as a four-channel polarization beam splitter) may use the four attached surfaces to perform reflection and transmission on the first polarized light and the second polarized light, to separate the first polarized light from the second polarized light. Therefore, separation between the first polarized light and the second polarized light can be implemented using the first polarization beam splitter with a relatively small size. That is, a size of the AR apparatus is further reduced by reusing the first polarization beam splitter.

In an example, in order to improve quality of an image that is finally imaged by the AR apparatus into an eye, a light homogenization subsystem 102 may be further added between the light-emitting light source 101 and the polarization splitting subsystem 104. The light homogenization subsystem 102 is configured to process natural light emitted by the light-emitting light source 101 into homogeneous mixed-color natural light. Further, a light homogenization system may be a light rod or a lens array. A function of the light homogenization system is to mix and homogenize RGB three-color light and output homogeneous mixed-color light. A light homogenization principle of a light rod is that light is reflected in the light rod for a plurality of times, a virtual light source image is formed after each reflection, and a two-dimensional virtual light source matrix is formed after reflection for the plurality of times such that light is more homogeneous.

In another example, a light spot of natural light or homogeneous mixed-color natural light may be relatively small, and cannot reach the polarization splitting subsystem 104, or incident light spots are too small, and cannot be evenly distributed in the polarization splitting subsystem 104. If the AR apparatus does not include the light homogenization subsystem 102, a beam expansion subsystem 103 may be added between the light-emitting light source 101 and the polarization splitting subsystem 104 such that the light spot of the natural light is expanded to reach the polarization splitting subsystem 104. If the AR apparatus includes the light homogenization subsystem 102, a beam expansion subsystem 103 may be added between the light homogenization subsystem 102 and the polarization splitting subsystem 104 such that the light spot of the homogeneous mixed-color natural light is expanded to reach the polarization splitting subsystem 104. The AR apparatus shown in FIG. 1 includes the light homogenization subsystem 102 and the beam expansion subsystem 103.

The first image source 105 is configured to convert incident first polarized light into second polarized light through reflection, and the second polarized light enters the polarization splitting subsystem 104.

The first image source 105 may be a display panel. The display panel performs spatial modulation on incident light to generate a light pattern. The light pattern is light that carries virtual image information. In this embodiment of this application, the generated light pattern is a virtual image in an image that is finally imaged into an eye. The display panel may be a liquid crystal on silicon (LCOS) image source, a digital light processing (DLP) image source, a micro-electro-mechanical systems (MEMS) image source, or the like.

The polarization splitting subsystem 104 is further configured to transport the second polarized light to the first optical subsystem 106.

An optical path of the first optical subsystem 106 includes that the second polarized light is transmitted through the first lens group 109 and enters the first quarter-wave plate 110, and then is transported through the first quarter-wave plate 110 to the first reflection surface 111, after being reflected by the first reflection surface 111, the reflected polarized light enters the first quarter-wave plate 110, and is transported through the first quarter-wave plate 110 to the first lens group 109, and first polarized light transported through the first quarter-wave plate 110 is transmitted by the first lens group 109 to the polarization splitting subsystem 104. Because a few small errors exist in a lens processing process, if the second polarized light enters the first quarter-wave plate 110 first, and then enters the first lens group 109, a polarization state of polarized light obtained after processing by the first quarter-wave plate 110 is affected and changed when the polarized light passes through the first lens group 109, and contrast of an image that is finally imaged into an eye is reduced. In this embodiment of this application, the second polarized light enters the first lens group 109 first, and then enters the first quarter-wave plate 110 such that a change in polarization state of polarized light caused by small errors in a lens processing process can be reduced, and contrast of an image finally imaged into an eye can be improved. That is, after the second polarized light passes through the quarter-wave plate and is reflected by the first reflection surface, the first polarized light directly enters the first quarter-wave plate again. The shortest round trip results in a better effect, that is, the polarized light is prevented from passing through more components, and a problem that a polarization state slightly changes due to non-ideality of the components, such as roughness and a material refractive index, is avoided.

It should be noted that, in an example, a position of the first lens group 109 and a position of the first quarter-wave plate 110 in the first optical subsystem 106 may be interchanged. To be specific, an optical path of the first optical subsystem 106 obtained after the position of the first lens group 109 and the position of the first quarter-wave plate 110 are interchanged includes that the second polarized light is processed by the first quarter-wave plate 110 into polarized light, and the polarized light is transmitted to the first lens group 109 and then transported through the first lens group 109 to the first reflection surface 111, after being reflected by the first reflection surface 111, the reflected polarized light enters the first lens group 109, and is transported through the first lens group 109 to the first quarter-wave plate 110, and the first quarter-wave plate 110 processes the polarized light transported through the first lens group 109 into first polarized light, and transports the first polarized light to the polarization splitting subsystem 104.

The first lens group 109 includes at least two lenses, and the lens may be an abnormally-shaped lens such as a biconvex lens, a biconcave lens, a convex-concave lens, or a concave-convex lens. It should be noted that some lenses in the first lens group 109 are configured to converge light, and the other lenses are configured to diverge light.

For example, the first lens group 109 may include three lenses, and the three lenses are a biconvex lens, a convex-concave lens, and a biconvex lens. When polarized light transported from the polarization splitting subsystem 104 enters the first lens group 109, the polarized light successively passes through the biconvex lens, the convex-concave lens, and the biconvex lens. When the polarized light that is reflected by the first reflection surface 111 and transported through the first quarter-wave plate 110 passes through the first lens group 109 again, the polarized light successively passes through the biconvex lens, the convex-concave lens, and the biconvex lens. That is, light transmitted through the first lens group 109 undergoes convergence, divergence, and convergence. Through light convergence and divergence, an optical path of a light beam is adjusted such that optical paths of light beams at a relatively large angle of view are consistent, that is, an optical path difference between light beams is the smallest. In this way, resolution of an image that is finally imaged into an eye is improved, and distortion that may occur in an image transmission process is reduced.

For another example, the first lens group includes a biconvex lens and a convex-concave lens. When the second polarized light transported from the polarization splitting subsystem 104 enters the first lens group 109, the second polarized light is transmitted through the biconvex lens and enters the convex-concave lens, and the second polarized light is transmitted through the convex-concave lens and enters the first quarter-wave plate. First polarized light transported from the first quarter-wave plate enters the convex-concave lens and is transmitted, and the first polarized light is transmitted through the biconvex lens and enters the polarization splitting subsystem. The polarized light successively passes through the biconvex lens and the convex-concave lens. That is, light transmitted through the first lens group 109 undergoes convergence and divergence. Through light convergence and divergence, an optical path of a light beam is adjusted such that optical paths of light beams at a relatively large angle of view are consistent, that is, an optical path difference between light beams is the smallest. In this way, resolution of an image that is finally imaged into an eye is improved, and distortion that may occur in an image transmission process is reduced.

For another example, the first lens group includes a biconvex lens, a biconcave lens, and a biconvex lens. When polarized light transported from the polarization splitting subsystem 104 enters the first lens group 109, the polarized light successively passes through the biconvex lens, the biconcave lens, and the biconvex lens. When the polarized light that is reflected by the first reflection surface 111 and transported through the first quarter-wave plate 110 passes through the first lens group 109 again, the polarized light successively passes through the biconvex lens, the biconcave lens, and the biconvex lens. That is, light transmitted through the first lens group 109 undergoes convergence, divergence, and convergence. Through light convergence and divergence, an optical path of a light beam is adjusted.

For another example, the first lens group includes a biconvex lens, a convex-concave lens, and a concave-convex lens. When polarized light transported from the polarization splitting subsystem 104 enters the first lens group 109, the polarized light successively passes through the biconvex lens, the convex-concave lens, and the concave-convex lens. When the polarized light that is reflected by the first reflection surface 111 and transported through the first quarter-wave plate 110 passes through the first lens group 109 again, the polarized light successively passes through the concave-convex lens, the convex-concave lens, and the biconvex lens. That is, light transmitted through the first lens group 109 undergoes convergence, divergence, and convergence. Through light convergence and divergence, an optical path of a light beam is adjusted.

The first reflection surface 111 may be a flat surface or a curved surface, and this is not limited herein. In FIG. 1, that the first reflection surface 111 is a flat surface is used as an example.

The polarization splitting subsystem 104 is further configured to reflect the first polarized light, and the reflected first polarized light enters the first combination subsystem 112. When natural light is incident, the polarization splitting subsystem 104 splits the natural light into first polarized light and second polarized light. When first polarized light is transported from the first optical subsystem 106, the transported first polarized light is reflected to the first combination subsystem 112. In this way, the polarization splitting subsystem is reused, and the size of the AR apparatus is further reduced.

The first combination subsystem 112 is configured to combine the incident first polarized light and incident first external ambient light, and combined light is imaged into an eye. The first external ambient light may be combined with the first polarized light in the first combination subsystem 112. It should be noted that the first combination subsystem 112 needs to select a combination subsystem whose angle of view matches an angle of view of light carrying virtual image information. A size of an image generated based on first polarized light that is reflected by the polarization splitting subsystem 104 and output by the first optical subsystem 106 is too large to be accepted by an eye. The first combination subsystem 112 may process the incident first polarized light that is reflected by the polarization splitting subsystem 104 and output by the first optical subsystem 106 in order to ensure a relatively large angle of view of the AR apparatus. For example, the angle of view is greater than 50°. The first combination subsystem 112 may limit light with a relatively large angle of view to relatively small space such that a generated image is reduced in size and focused, sharpness of the image that is imaged into an eye is improved, and distortion of the image is reduced, thereby improving quality of the image that is imaged into an eye as a whole.

For ease of understanding, an optical transport path of the AR apparatus shown in FIG. 1 may be shown as follows: the light source (101)—the light homogenization subsystem (102)—the beam expansion subsystem (103)—the first polarizer (108)—the polarization splitting subsystem (104, 107)—the image source (105)—the polarization splitting subsystem (104,107)—the first lens group (109)—the first quarter-wave plate (110)—the first reflection surface (111)—the first quarter-wave plate (110)—the first lens group (109)—the polarization splitting subsystem (104, 107)—the first combination subsystem (112).

Figure 3:
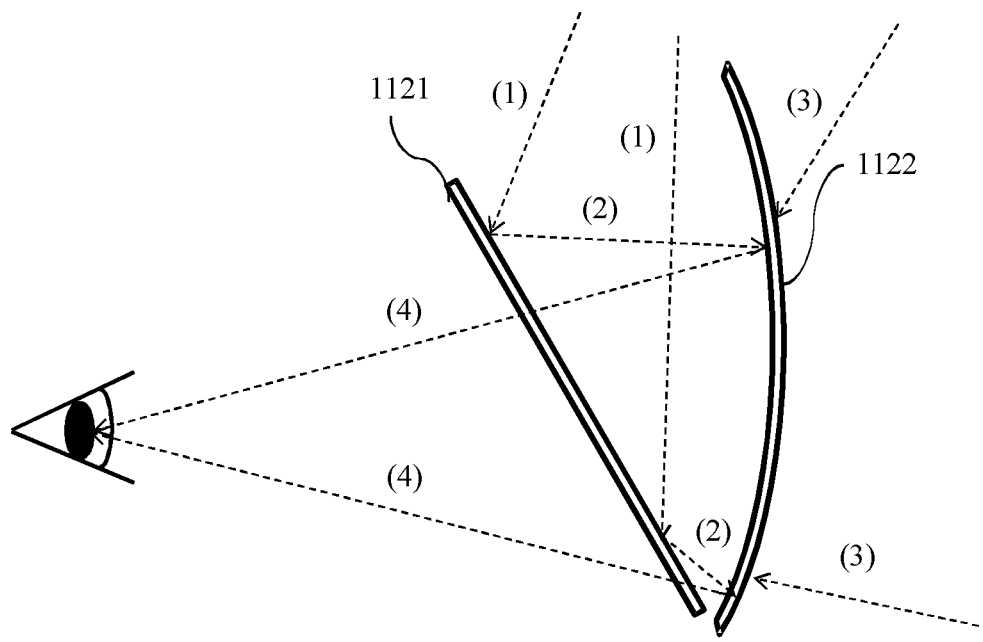
FIG. 3 is a schematic structural diagram of a combination subsystem according to an embodiment of this application.

FIG. 3 is a schematic structural diagram of a combination subsystem (which is also referred to as a light combiner) according to an embodiment of this application. As shown in FIG. 3, the combination subsystem may include a first beam splitter 1121 and a first combination surface 1122. A function of the combination subsystem is to combine light carrying virtual image information and light carrying an external real image in order to synchronously image the light carrying virtual image information and the light carrying an external real image into an eye. That is, a virtual image can be transmitted to an eye without affecting transmission of an external real image. The combination subsystem may be implemented using a light combiner technology such as a diffraction optical waveguide, a reflection optical waveguide, or free space.

An optical path of light in the combination subsystem is shown in FIG. 3. (1) Incident first polarized light enters the first beam splitter 1121. (2) The first polarized light is reflected by the first beam splitter 1121 to the first combination surface 1122. (3) First external ambient light is incident on the first combination surface 1122. (4) The first external ambient light and the first polarized light are combined, and the combined light is imaged into an eye after being transmitted through the first beam splitter 1121. The combined light carries virtual image information and external real image information. A combined image including a virtual image and an external real image is formed in an eye of a user.

Figure 4:
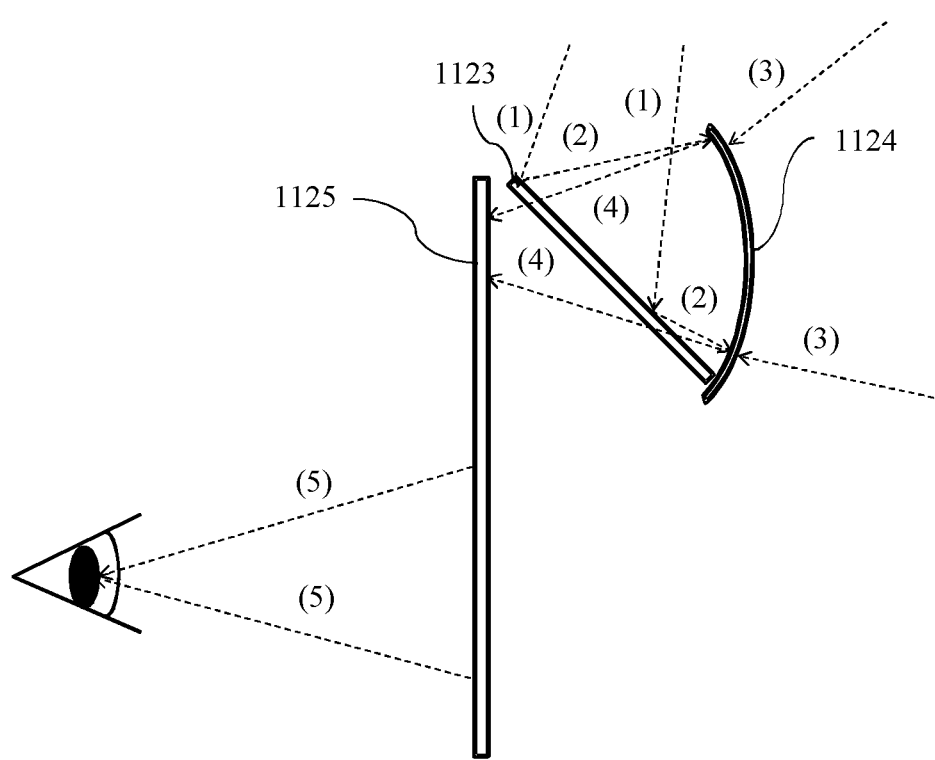
FIG. 4 is a schematic structural diagram of another combination subsystem according to an embodiment of this application.

FIG. 4 is a schematic structural diagram of another combination subsystem according to an embodiment of this application. As shown in FIG. 4, the combination subsystem may include a second beam splitter 1123, a second combination surface 1124, and a waveguider 1125. A function of the combination subsystem is to combine light carrying virtual image information and light carrying an external real image in order to synchronously image the light carrying virtual image information and the light carrying an external real image into an eye. That is, a virtual image can be transmitted to an eye without affecting transmission of an external real image.

An optical path of light in the combination subsystem is shown in FIG. 4. (1) Incident first polarized light enters the second beam splitter 1123. (2) The incident first polarized light is reflected by the second beam splitter 1123 to the second combination surface 1124. (3) First external ambient light is incident on the second combination surface 1124. (4) The first external ambient light and the first polarized light are combined. and the combined light is transmitted through the second beam splitter 1123 and enters the waveguider 1125. (5) After the combined light undergoes total reflection and diffraction in the waveguider 1125, the combined light is transported out of the waveguider 1125 and imaged into an eye. The combined light carries virtual image information and external real image information. A combined image including a virtual image and an external real image is formed in an eye of a user. Because the user receives the combined light from the waveguider 1125, and the combined light undergoes total reflection and diffraction in the waveguider 1125, an image of sufficient size can be generated using the second beam splitter 1123 and the second combination surface 1124 that are of a relatively small size together with the waveguider 1125, thereby further reducing the size of the AR apparatus.

The first combination subsystem 112 in this embodiment of this application may be the combination subsystem shown in FIG. 3 or FIG. 4. It should be understood that the second combination subsystem 129 mentioned below may also be the combination subsystem having the structure shown in FIG. 3 or FIG. 4.

It can be learned from the above that, the second polarized light that carries the virtual image information is transported to the first optical subsystem 106, and reaches the first reflection surface 111 after passing through the first lens group 109 and the first quarter-wave plate 110. The first reflection surface 111 reflects the polarized light that carries the virtual image information such that the polarized light that carries the virtual image information passes through the first quarter-wave plate 110 and the first lens group 109 again. The first optical subsystem 106 implements a round trip of light. That is, for each lens in the first lens group 109, the polarized light passes through the lens twice in opposite directions. The polarized light that carries the virtual image information and the external ambient light that carries the real image information are imaged into the eye after passing through the combination subsystem. In this technical solution, using a combination of one first lens group 109 and the first reflection surface 111 may achieve an effect of using two lens groups, thereby reducing a quantity of lenses by half. In addition, a larger quantity of lenses through which polarized light passes indicates a stronger capability of correcting marginal light, and therefore a larger angle of view of imaging. In this technical solution, the polarized light passes through the first lens group 109 twice, that is, passes through a double quantity of lenses in the first lens group 109, thereby enlarging an angle of view. The size of the entire AR apparatus is correspondingly reduced under a condition that a large angle of view is ensured.

Figure 5:
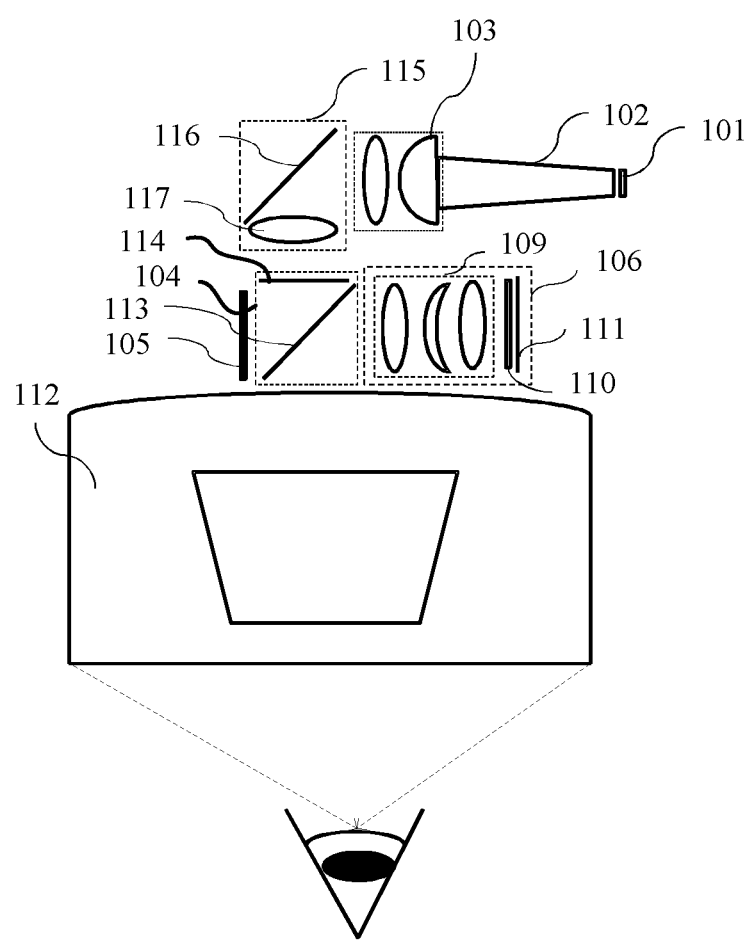
FIG. 5 is a schematic structural diagram of an AR apparatus according to another embodiment of this application.

FIG. 5 is a schematic structural diagram of an AR apparatus according to another embodiment of this application. A difference between the AR apparatus shown in FIG. 5 and the AR apparatus shown in FIG. 1 lies in that a polarization splitting subsystem 104 is different, and the AR apparatus may further include a light reflection module 115.

As shown in FIG. 5, the light reflection module 115 may be disposed between a light-emitting light source 101 and the polarization splitting subsystem 104, and the light reflection module 115 may reflect natural light to the polarization splitting subsystem 104. In an example, the light reflection module 115 may include a first reflection plate 116. The natural light may be reflected by the first reflection plate 116 and then incident on the polarization splitting subsystem. At least one surface of the first reflection plate 116 is a reflection surface, and the first reflection plate 116 may be a flat reflection plate or a curved reflection plate.

In an example, a light adjustment lens 117 may be added between the reflection plate and the polarization splitting subsystem. It should be understood that the light adjustment lens 117 may be selectively set based on an actual application scenario. The natural light may be reflected by the first reflection plate 116 and then input to the polarization splitting subsystem 104 through the light adjustment lens 117. The light adjustment lens 117 may slightly adjust scattered light, thereby improving quality of an image that is finally imaged into an eye.

The polarization splitting subsystem 104 includes a second polarization beam splitter 113. In an example, the second polarization beam splitter 113 may be a sheet-like polarization beam splitter.

The natural light is incident on the second polarization beam splitter 113, first polarized light in the natural light is reflected by the second polarization beam splitter 113 to a first image source 105, the first polarized light is reflected by the first image source 105 and becomes second polarized light, and the second polarized light is transmitted through the second polarization beam splitter 113 in order to enter a first optical subsystem 106. It should be noted that the second polarized light generated after the reflection by the first image source 105 carries virtual image information. That is, the second polarized light entering the first optical subsystem 106 carries the virtual image information.

Second polarized light in the natural light is transmitted through the second polarization beam splitter 113, and is transported downward to a first combination subsystem 112.

The second polarized light in the natural light does not pass through the first image source 105, and therefore the second polarized light in the natural light carries no virtual image information. The second polarized light carrying no virtual image information does not change content of an image generated by the second polarized light that carries the virtual image information.

To further improve definition of an image that is finally imaged into an eye, the second polarized light carrying no virtual image information may be filtered out in advance. A second polarizer 114 may be added between the light reflection module and the second polarization beam splitter 113. The second polarizer 114 may filter out the second polarized light in the natural light and output the first polarized light in the natural light to the second polarization beam splitter 113. After the second polarizer 114 is added, light incident on the second polarization beam splitter 113 is the first polarized light in the natural light. After the second polarized light in the natural light is filtered out, impact of the second polarized light carrying no virtual image information on definition of the image generated by the second polarized light that carries the virtual image information can be avoided.

Figure 6:
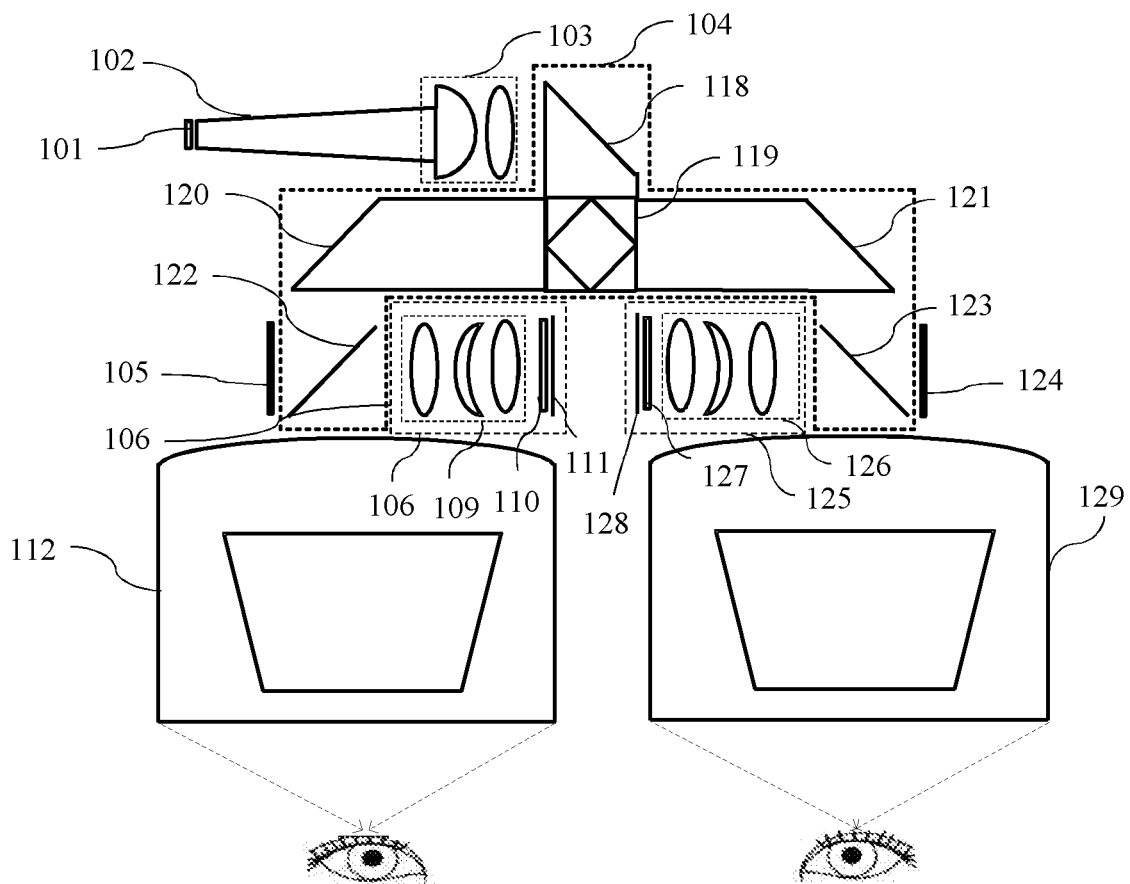
FIG. 6 is a schematic structural diagram of an AR apparatus according to still another embodiment of this application.

FIG. 6 is a schematic structural diagram of an AR apparatus according to still another embodiment of this application. The AR apparatus in this embodiment of this application is used for binocular imaging, and a second image source 124 corresponding to a first image source 105, a second optical subsystem 125 corresponding to a first optical subsystem 106, and a second combination subsystem 129 corresponding to a first combination subsystem 112 are added. A structure of the second optical subsystem 125 is the same as or symmetric with a structure of the first optical subsystem 106, and a structure of the second combination subsystem 129 is the same as or symmetric with a structure of the first combination subsystem 112. The second optical subsystem 125 includes a second lens group 126, a second quarter-wave plate 127, and a second reflection surface 128.

In the AR apparatus for binocular imaging, a light-emitting light source 101 is shared. The polarization splitting subsystem 104 reflects first polarized light in incident natural light, and the reflected first polarized light enters the first image source 105. In addition, the polarization splitting subsystem 104 may be further configured to reflect second polarized light in the incident natural light, and the reflected second polarized light enters the second image source 124.

In FIG. 6, the polarization splitting subsystem 104 may include an input light reflection surface 118, a third polarization beam splitter 119, a fourth polarization beam splitter 122, a fifth polarization beam splitter 123, a first polarized light reflection surface 120, and a second polarized light reflection surface 121. The first polarized light reflection surface 120 and the second polarized light reflection surface 121 are symmetrically disposed. In this embodiment, a structure of the third polarization beam splitter 119 may be the same as a structure of the first polarization beam splitter 107. In addition, in the AR apparatus for binocular imaging shown in FIG. 6, a light homogenization subsystem and the polarization splitting subsystem 104 are shared such that a system size can be reduced by 20%, and optical efficiency can be improved by more than 30%.

Figure 7:
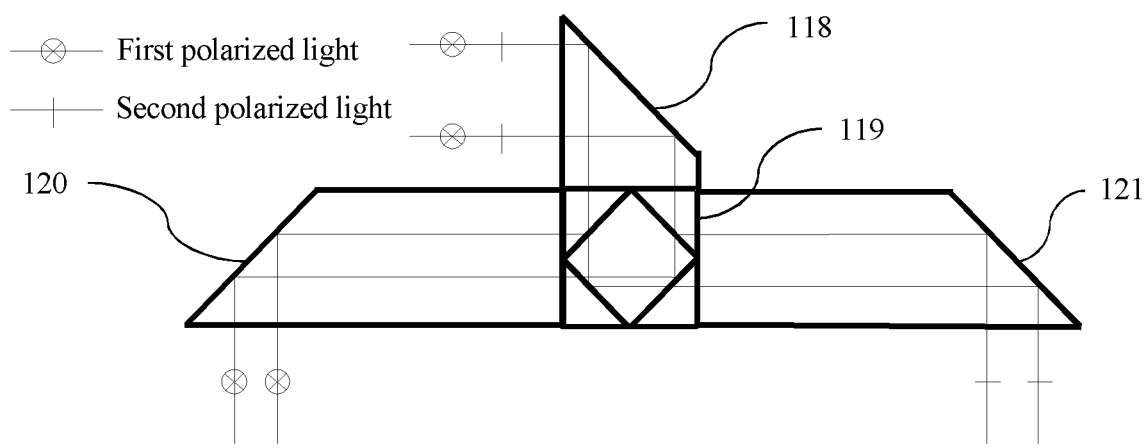
FIG. 7 is a schematic diagram of an optical path of a polarization splitting subsystem according to still another embodiment of this application.

FIG. 7 is a schematic diagram of an optical path of the polarization splitting subsystem 104 according to the still another embodiment of this application. As shown in FIG. 7, natural light is incident on the input light reflection surface 118. The natural light is reflected by the input light reflection surface 118 and then incident on the third polarization beam splitter 119. The third polarization beam splitter 119 splits the light reflected by the input light reflection surface 118 into first polarized light and second polarized light. The first polarized light is reflected and output by the first polarized light reflection surface 120, and the second polarized light is reflected and output by the second polarized light reflection surface 121.

The first polarized light output by the first polarized light reflection surface 120 is reflected by the fourth polarization beam splitter 122 to the first image source 105. The first image source 105 reflects, to the fourth polarization beam splitter, second polarized light that is obtained by reflecting the incident first polarized light. The second polarized light reflected from the first image source 105 passes through the fourth polarization beam splitter 122 and enters the first optical subsystem 106.

The second polarized light entering the first optical subsystem 106 passes through a first lens group 109, a first quarter-wave plate 110, and a first reflection surface 111. Light transmitted out of the first optical subsystem 106 is the first polarized light, and the first polarized light carries virtual image information. The first polarized light that carries the virtual image information enters the first combination subsystem 112. Combined light in the first combination subsystem 112 enters the left eye of a user for imaging.

The second polarized light output by the second polarized light reflection surface 121 is reflected by the fifth polarization beam splitter 123 to the second image source 124. The second image source 124 reflects, to the fifth polarization beam splitter, first polarized light that is obtained by reflecting the incident second polarized light. The first polarized light reflected from the second image source 124 passes through the fifth polarization beam splitter 123 and enters the second optical subsystem 125.

The first polarized light entering the second optical subsystem 125 passes through the second lens group 126, the second quarter-wave plate 127, and the second reflection surface 128. Light transported from the second optical subsystem 125 is the second polarized light, and the second polarized light carries virtual image information. The second polarized light that carries the virtual image information enters the second combination subsystem 129. Combined light in the second combination subsystem 129 enters the right eye of the user for imaging.

The second image source 124 is configured to convert the incident second polarized light into the first polarized light through reflection, and the first polarized light enters the polarization splitting subsystem 104.

The second image source 124 may be a reflective image source such as an LCOS image source or a DLP image source. The second image source 124 may be the same as the first image source 105.

The polarization splitting subsystem 104 is further configured to transport the first polarized light to the second optical subsystem 125.

An optical path of the second optical subsystem 125 includes that the first polarized light is transmitted through the second lens group 126 and enters the second quarter-wave plate 127, and then is transported through the second quarter-wave plate 127 to the second reflection surface 128, after being reflected by the second reflection surface 128, the reflected polarized light enters the second quarter-wave plate 127, and is transported through the second quarter-wave plate 127 to the second lens group 126, and second polarized light transported through the second quarter-wave plate 127 is transmitted by the second lens group 126 to the polarization splitting subsystem 104.

It should be noted herein that specific structures of the second lens group 126, the second quarter-wave plate 127, and the second reflection surface 128 may be the same as those of the first lens group 109, the first quarter-wave plate 110, and the first reflection surface 111 in the first optical subsystem 106. For an internal structure of the second lens group 126, refer to related descriptions of the first lens group 109.

The polarization splitting subsystem 104 is further configured to reflect the second polarized light, and the reflected second polarized light enters the second combination subsystem 129. When natural light is incident, the polarization splitting subsystem 104 splits the natural light into first polarized light and second polarized light. When the second polarized light is transported from the second optical subsystem 125, the transported second polarized light is reflected to the second combination subsystem 129. In this way, the polarization splitting subsystem is reused, and a size of the AR apparatus is further reduced.

The second combination subsystem 129 is configured to combine the incident second polarized light and incident second external ambient light, and the combined light is imaged into the eye.

The first external ambient light partially overlaps the second ambient light, and in an extreme condition, the first external ambient light may completely overlap the second external ambient light. For a specific structure of the second combination subsystem 129, refer to the structure of the first combination subsystem 112 and the structures of the combination subsystems shown in FIG. 3 and FIG. 4. Details are not described herein again.

The polarization splitting subsystem 104 in this embodiment of this application splits natural light into first polarized light and second polarized light, introduces the first polarized light to the first optical subsystem 106, which inputs the first polarized light to the first combination subsystem 112, and introduces the second polarized light to the second optical subsystem 125, which inputs the second polarized light to the second optical subsystem 129. Therefore, binocular imaging with AR is implemented. In addition, in this application, the polarization splitting subsystem 104 is shared in the AR apparatus that is applied to both eyes, and the polarization splitting subsystem 104 does not need to be separately disposed for each eye such that the size of the AR apparatus is reduced. In addition, the first polarized light and the second polarized light are separately used such that a light loss is reduced.

Figure 8:
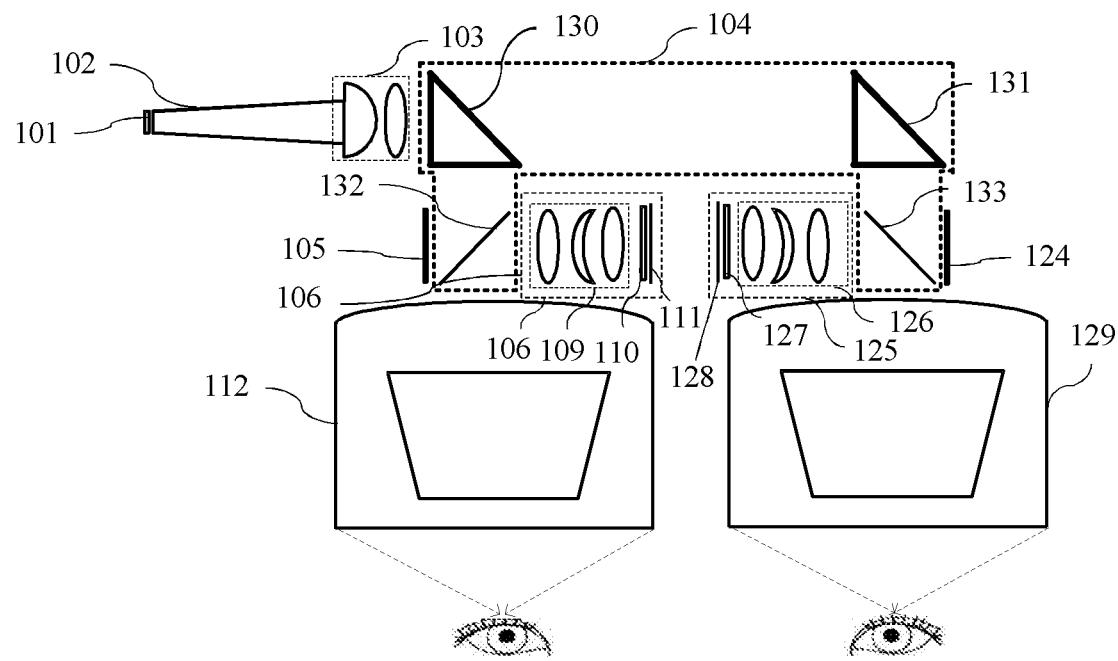
FIG. 8 is a schematic structural diagram of an AR apparatus according to yet another embodiment of this application.

FIG. 8 is a schematic structural diagram of an AR apparatus according to yet another embodiment of this application. A difference between the AR apparatus shown in FIG. 8 and the AR apparatus shown in FIG. 6 lies in that a polarization splitting subsystem 104 is different.

As shown in FIG. 8, the polarization splitting subsystem 104 includes a sixth polarization beam splitter 130, a second reflection plate 131, a seventh polarization beam splitter 132, and an eighth polarization beam splitter 133. At least one surface of the second reflection plate 131 is a reflection surface, and the second reflection plate 131 may be a flat reflection plate or a curved reflection plate. This is not limited in this application.

Figure 9:
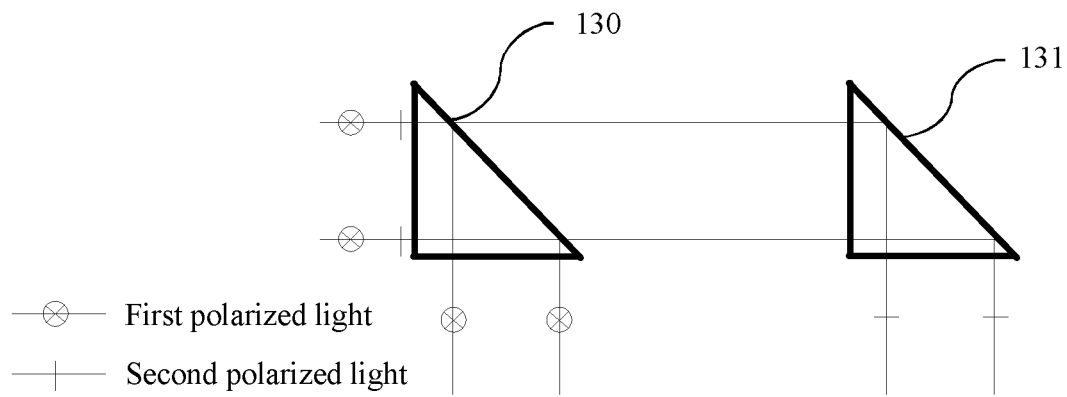
FIG. 9 is a schematic diagram of an optical path of a polarization splitting subsystem according to yet another embodiment of this application.

FIG. 9 is a schematic diagram of an optical path of the polarization splitting subsystem 104 according to the yet another embodiment of this application. As shown in FIG. 9, natural light is incident on the sixth polarization beam splitter 130, first polarized light in the natural light is reflected by the sixth polarization beam splitter 130 to the seventh polarization beam splitter 132, the seventh polarization beam splitter 132 reflects, to a first image source 105, the first polarized light reflected from the sixth polarization beam splitter 130, the first image source 105 converts the first polarized light into second polarized light through reflection, and the second polarized light reflected from the first image source 105 is transmitted through the seventh polarization beam splitter 132 and reaches a first optical subsystem 106.

Second polarized light in the natural light is transmitted to the second reflection plate 131 through the sixth polarization beam splitter 130, the second reflection plate 131 reflects the second polarized light transmitted through the sixth polarization beam splitter 130 to the eighth polarization beam splitter 133, the eighth polarization beam splitter 133 reflects, to a second image source 124, the second polarized light reflected from the second reflection plate 131, the second image source 124 converts the second polarized light into first polarized light through reflection, and the first polarized light reflected from the second image source 124 is transmitted through the eighth polarization beam splitter 133 and reaches a second optical subsystem 125.

Because the light is not strictly collimated light, when the light reaches the second reflection plate 131 through the sixth polarization beam splitter 130, light field distribution changes. Consequently, light intensity is inconsistent when the light reaches the left eye and the right eye. To ensure intensity consistency between the light reaching the left eye and the light reaching the right eye, a lens group may be added between the sixth polarization beam splitter 130 and the second reflection plate 131 to slightly adjust the light field distribution. After the lens group is added, light transmitted from the sixth polarization beam splitter 130 first passes through the lens group, and then is reflected by the second reflection plate 131. The lens group may include one or more lenses. To reduce a size of the AR apparatus, only one lens may be disposed in the lens group.

Figure 10:
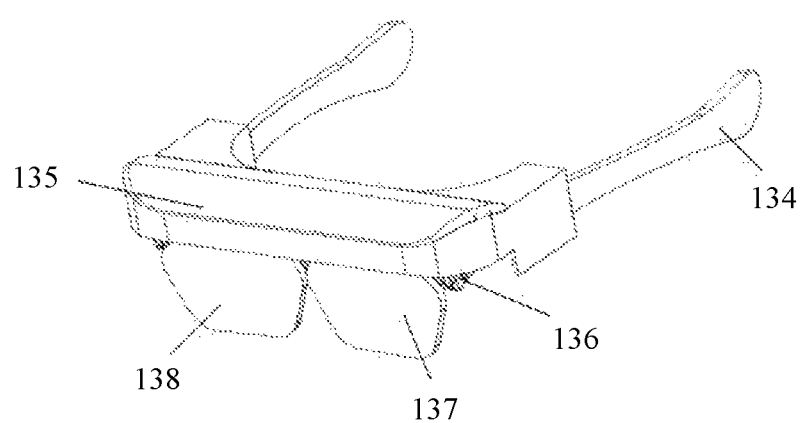
FIG. 10 is a schematic structural diagram of AR glasses according to an embodiment of this application.

The foregoing AR apparatus may be AR glasses. FIG. 10 is a schematic structural diagram of AR glasses according to an embodiment of this application. As shown in FIG. 10, the AR glasses include glasses temples 134, a frame 135, a left-eye lens 137, a right-eye lens 138, and an optical machine (also referred to as an optical engine component) 136.

The glasses temple 134 and the frame 135 may be metal structures or plastic structures, and this is not limited herein. In addition, the glasses temple 134 and the frame 135 may be made of the same material or different materials. The left-eye lens 137 may be integrated with the first combination subsystem in the AR apparatus in the foregoing embodiment, and the right-eye lens 138 may be integrated with the second combination subsystem in the AR apparatus in the foregoing embodiment. That is, the left-eye lens 137 has a function of the first combination subsystem, and the right-eye lens 138 has a function of the second combination subsystem. The optical machine 136 is an integration of optical components in the AR apparatus in the foregoing embodiment. When the AR glasses are worn, the optical machine 136 may be located between a user's eyes and the left-eye lens 137 and the right-eye lens 138. In an implementation, the optical machine 136 may include the light-emitting light source 101, the polarization splitting subsystem 104, the first image source 105, and the first optical subsystem 106 in the foregoing embodiment. In another implementation, the optical machine 136 may include the light-emitting light source 101, the polarization splitting subsystem 104, the first image source 105, the first optical subsystem 106, the light homogenization subsystem 102, and the beam expansion subsystem 103 in the foregoing embodiment. In still another implementation, the optical machine 136 may include the light-emitting light source 101, the polarization splitting subsystem 104, the first image source 105, the second image source 124, the first optical subsystem 106, the second optical subsystem 125, the light homogenization subsystem 102, and the beam expansion subsystem 103 in the foregoing embodiment, where the light-emitting light source 101 is a shared light-emitting light source, and the light homogenization subsystem 102 is a shared light homogenization subsystem. It should be understood that for detailed description of the optical machine 136, refer to other embodiments of this application, and details are not described herein again.

When the user wears the AR glasses, the user's eyes receive, using the optical machine 136, the left-eye lens 137, and the right-eye lens 138, combined light including light that carries virtual image information and light that carries real image information such that images are formed in the user's eyes, and the user sees, using the AR glasses, a combined image that includes a virtual image and a real image.

Figure 11:
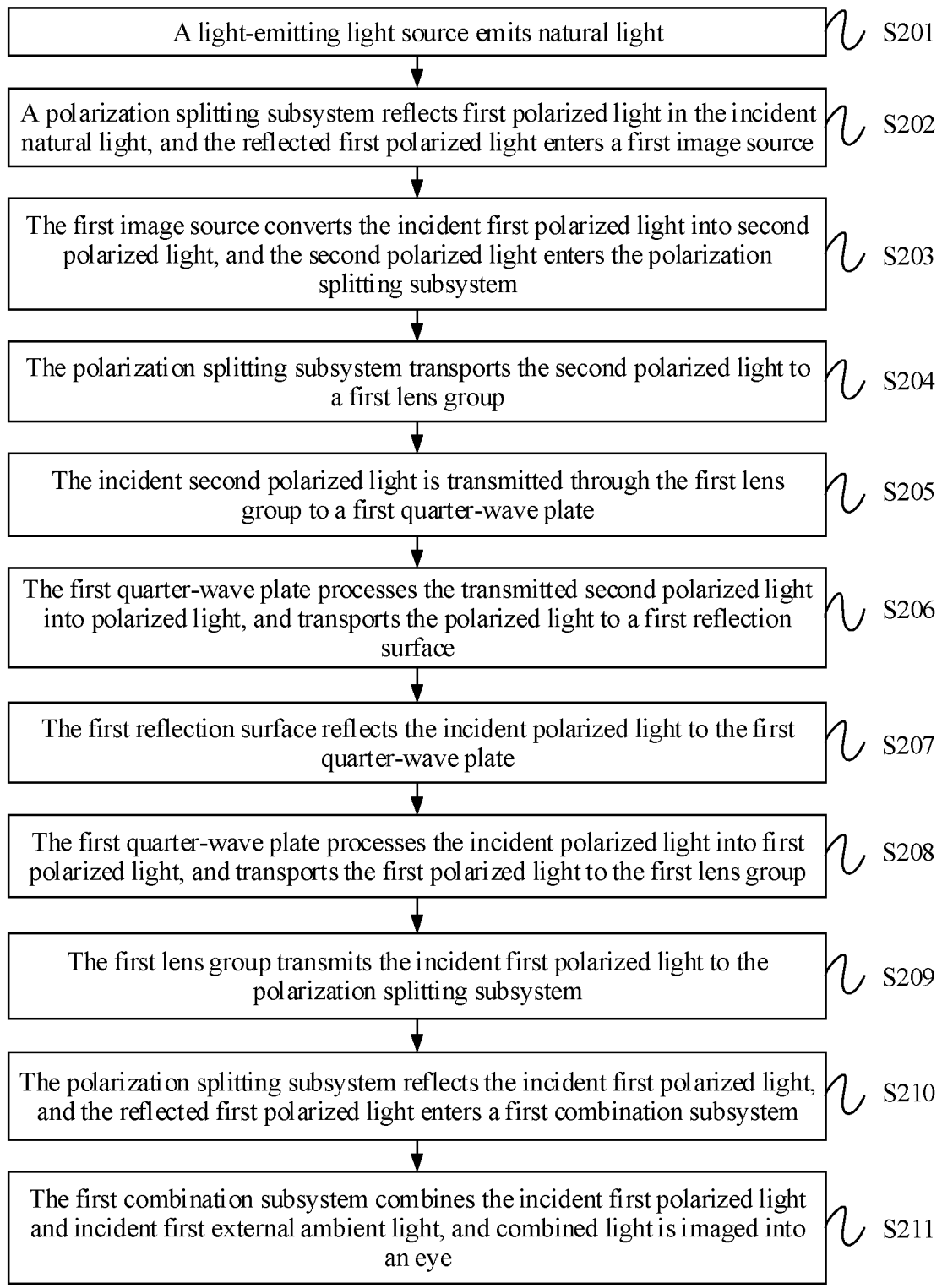
FIG. 11 is a flowchart of an AR method according to an embodiment of this application.

FIG. 11 is a flowchart of an AR method according to an embodiment of this application. The AR method may be applied to the AR apparatus in the foregoing embodiment. As shown in FIG. 11, the AR method may include step S201 to step S211.

In step S201, a light-emitting light source emits natural light.

In step S202, a polarization splitting subsystem reflects first polarized light in the incident natural light, and the reflected first polarized light enters a first image source.

In step S203, the first image source converts the incident first polarized light into second polarized light, and the second polarized light enters the polarization splitting subsystem.

In step S204, the polarization splitting subsystem transports the second polarized light to a first lens group.

In step S205, the incident second polarized light is transmitted through the first lens group to a first quarter-wave plate.

In step S206, the first quarter-wave plate processes the transmitted second polarized light into polarized light and transports the polarized light to a first reflection surface.

In step S207, the first reflection surface reflects the incident polarized light to the first quarter-wave plate.

In step S208, the first quarter-wave plate processes the incident polarized light into first polarized light, and transports the first polarized light to the first lens group.

In step S209, the first lens group transmits the incident first polarized light to the polarization splitting subsystem.

In step S210, the polarization splitting subsystem reflects the incident first polarized light, and the reflected first polarized light enters a first combination subsystem.

In step S211, the first combination subsystem combines the incident first polarized light and incident first external ambient light, and combined light is imaged into an eye.

Figure 12A:
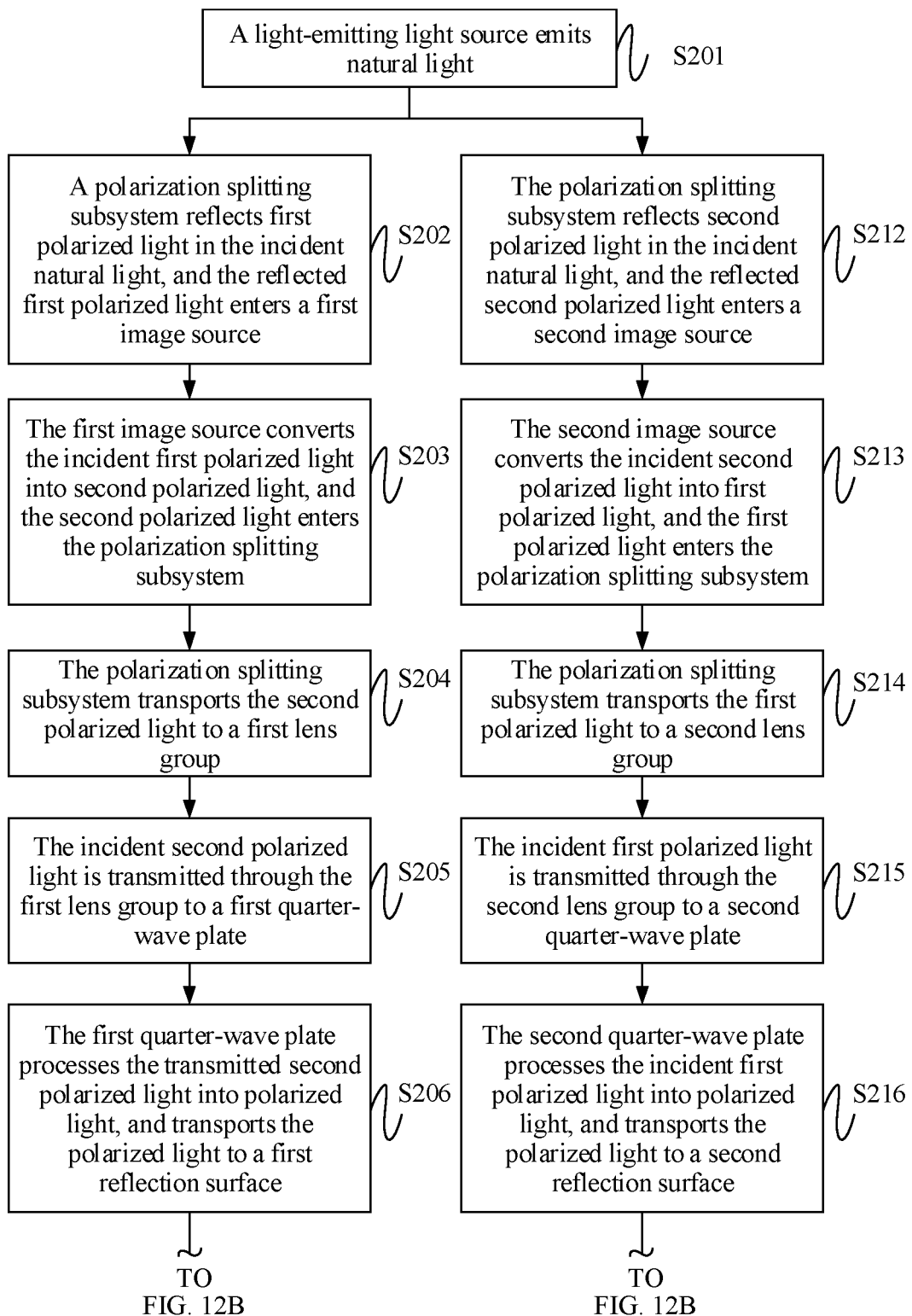
FIG. 12A and FIG. 12B are a flowchart of an AR method according to another embodiment of this application.
Figure 12B:
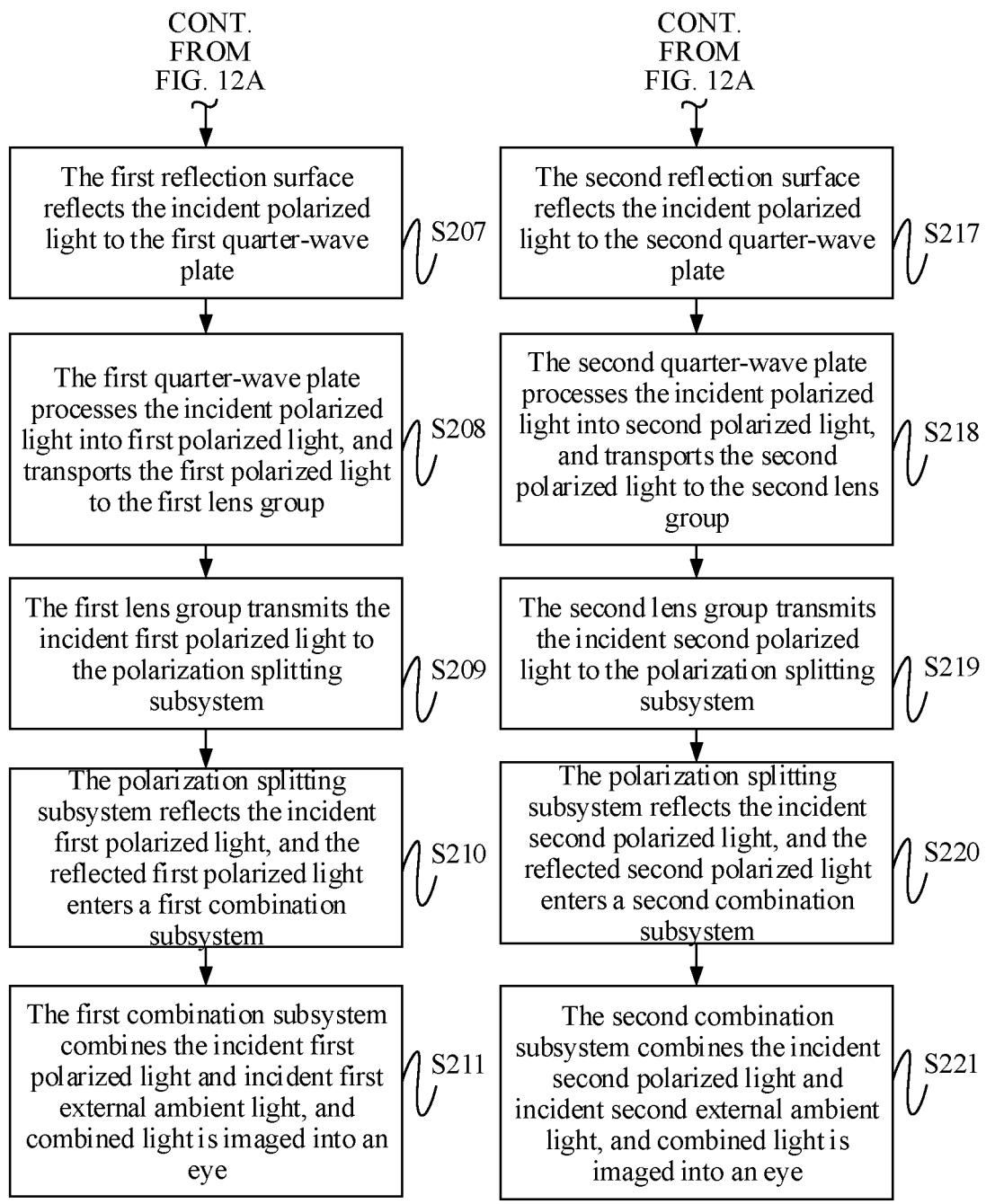

FIG. 12A and FIG. 12B are a flowchart of an AR method according to another embodiment of this application. The AR method may be applied to the AR apparatus applied to both eyes in the foregoing embodiment. As shown in FIG. 12A and FIG. 12B, on the basis of FIG. 11, the AR method may further include step S212 to step S221.

In step S212, the polarization splitting subsystem reflects second polarized light in the incident natural light, and the reflected second polarized light enters a second image source.

In step S213, the second image source converts the incident second polarized light into first polarized light, and the first polarized light enters the polarization splitting subsystem.

In step S214, the polarization splitting subsystem transports the first polarized light to a second lens group.

In step S215, the incident first polarized light passes through the second lens group and is transmitted to a second quarter-wave plate.

In step S216, the second quarter-wave plate processes the incident first polarized light into polarized light and transports the polarized light to a second reflection surface.

In step S217, the second reflection surface reflects the incident polarized light to the second quarter-wave plate.

In step S218, the second quarter-wave plate processes the incident polarized light into second polarized light, and transports the second polarized light to the second lens group.

In step S219, the second lens group transmits the incident second polarized light to the polarization splitting subsystem.

In step S220, the polarization splitting subsystem reflects the incident second polarized light, and the reflected second polarized light enters a second combination subsystem.

In step S221, the second combination subsystem combines the incident second polarized light and incident second external ambient light, and combined light is imaged into an eye.

The embodiments in this specification are all described in a progressive manner, for same or similar parts in the embodiments, refer to these embodiments, and each embodiment focuses on a difference from other embodiments. Especially, the method embodiment is basically similar to the apparatus embodiment, and therefore is described briefly, for related parts, refer to descriptions in the apparatus embodiment.

What is claimed is:

1. An augmented reality apparatus comprising:
a first combination subsystem;
a first optical subsystem comprising:
  a first lens group;
  a first quarter-wave plate; and
  a first reflection surface;
a light-emitting light source configured to emit natural light comprising first polarized light;
a polarization splitting subsystem coupled to the light-emitting light source and configured to:
  receive the natural light and
  reflect the first polarized light as reflected first polarized light;
a first image source coupled to the polarization splitting subsystem and configured to:
  receive the reflected first polarized light from the polarization splitting subsystem;
  convert the reflected first polarized light into second polarized light; and
  transmit the second polarized light to the polarization splitting sub system,
wherein the polarization splitting subsystem is further configured to:
  receive the second polarized light from the first image source; and
  transport the second polarized light,
wherein the first lens group is configured to:
  receive the second polarized light from the polarization splitting subsystem; and
  transmit the second polarized light through the first lens group to the first quarter-wave plate,
wherein the first quarter-wave plate is configured to:
  receive the second polarized light from the first lens group; and
  transport the second polarized light through the first quarter-wave plate to the first reflection surface,
wherein the first reflection surface is configured to:
  receive the second polarized light from the first quarter-wave plate; and
  reflect the second polarized light onto the first quarter-wave plate,
wherein the first quarter-wave plate is further configured to:
  receive the second polarized light from the first reflection surface; and
  transport the second polarized light through the first quarter-wave plate to the first lens group as the first polarized light,
wherein the first lens group is further configured to:
  receive the first polarized light from the first quarter-wave plate; and
  transmit the first polarized light to the polarization splitting subsystem,
wherein the polarization splitting subsystem is further configured to reflect the first polarized light onto the first combination subsystem, and
wherein the first combination subsystem is configured to:
  combine the first polarized light and incident first external ambient light to form combined light; and
  transmit the combined light into an eye.

2. The augmented reality apparatus of claim 1, wherein the first lens group comprises:
a first subset of lenses configured to converge light; and
a second subset of lenses configured to diverge light.

3. The augmented reality apparatus of claim 1, wherein the polarization splitting subsystem comprises a first polarization beam splitter, wherein the first polarization beam splitter is in a shape of a cuboid, wherein the first polarization beam splitter comprises:
a first polarization beam splitting component located at a middle of the first polarization beam splitter, wherein the first polarization beam splitting component is in a shape of a cuboid; and
four second polarization beam splitting components located around the first polarization beam splitting component, wherein each of the four second polarization beam splitting components is in a shape of a triangular prism, and wherein a bottom surface of each of the four second polarization beam splitting components is an isosceles right triangle, wherein each side face of the first polarization beam splitting component is attached to a first side face of a corresponding second polarization beam splitting component to form a first attached surface, a second attached surface, a third attached surface, and a fourth attached surface, wherein the first attached surface faces the third attached surface, wherein the second attached surface faces the fourth attached surface, and wherein the first side face of the corresponding second polarization beam splitting component corresponds to a right angle at a bottom surface of the corresponding second polarization beam splitting component,
wherein an optical path of the first polarization beam splitter sequentially runs through:
  a second polarization beam splitting component of the four second polarization beam splitting components is configured to receive the natural light or the first polarized light in the natural light to reach the first attached surface, wherein the first attached surface is configured to reflect the first polarized light in the natural light onto the first image source, wherein the first image source is configured to:
reflect the first polarized light as the second polarized light; and
transmit the second polarized light through the first attached surface to reach the fourth attached surface, wherein the fourth attached surface is configured to reflect, to the third attached surface, the second polarized light received from the first attached surface, wherein the third attached surface is configured to transmit the second polarized light out of the first polarization beam splitter;

another second polarization beam splitting component of the four second polarization beam splitting components is configured to receive the natural light or the first polarized light in the natural light to reach the fourth attached surface, wherein the fourth attached surface is configured to transmit the first polarized light in the natural light through the fourth attached surface to reach the third attached surface, wherein the third attached surface is configured to reflect the first polarized light to reach the second attached surface;

wherein the second attached surface is configured to transmit the first polarized light through the second attached surface to reach the first image source, wherein the first image source is further configured to reflect the first polarized light as the second polarized light to reach the second attached surface, and wherein the second attached surface is configured to reflect the second polarized light out of the first polarization beam splitter.

4. The augmented reality apparatus of claim 3, wherein the polarization splitting subsystem further comprises a first polarizer located between the light-emitting light source and the first polarization beam splitter, and wherein the first polarizer is configured to:
filter out the second polarized light in the natural light; and
output the first polarized light in the natural light to the first polarization beam splitter.

5. The augmented reality apparatus of claim 1, further comprising a light reflection system disposed between the light-emitting light source and the polarization splitting subsystem and configured to reflect the natural light to the polarization splitting subsystem.

6. The augmented reality apparatus of claim 5, wherein the light reflection system comprises:
a first reflection plate configured to:
receive the natural light; and
reflect the natural light; and
a light adjustment lens coupled to the first reflection plate and configured to:
receive the natural light reflected from the first reflection plate; and
input the natural light received from the first reflection plate to the polarization splitting subsystem through the light adjustment lens.

7. The augmented reality apparatus of claim 5, wherein the polarization splitting subsystem further comprises a second polarization beam splitter, and wherein an optical path of the second polarization beam splitter sequentially runs through:
the second polarization beam splitter is configured to:
receive the natural light or the first polarized light in the natural light; and
reflect the first polarized light in the natural light onto the first image source,
wherein the first image source is configured to reflect the first polarized light received from the second polarization beam splitter as the second polarized light, onto the second polarization beam splitter, and
wherein the second polarization beam splitter is configured to transmit the second polarized.

8. The augmented reality apparatus of claim 7, wherein the polarization splitting subsystem further comprises a second polarizer located between the light reflection module and the second polarization beam splitter and configured to:
filter out the second polarized light in the natural light; and
output the first polarized light in the natural light to the second polarization beam splitter.

9. The augmented reality apparatus of claim 1, further comprising:
a second image source;
a second optical subsystem, wherein a structure of the second optical subsystem is the same as or symmetric with a structure of the first optical subsystem, and wherein the second optical subsystem comprises a second lens group, a second quarter-wave plate, and a second reflection surface; and
a second combination subsystem, wherein a structure of the second combination subsystem is the same as or symmetric with a structure of the first combination subsystem,
wherein the polarization splitting subsystem is further configured to reflect the second polarized light in the natural light onto the second image source,
wherein the second image source is configured to:
convert the second polarized light into the first polarized light; and
transmit the first polarized light to the polarization splitting subsystem,
wherein the polarization splitting subsystem is further configured to transport the first polarized light to the second optical subsystem,
wherein an optical path of the second optical subsystem sequentially runs through:
wherein the second lens group is configured to transmit the first polarized light through the second lens group to the second quarter-wave plate,
wherein the second quarter-wave plate is configured to transport the first polarized light received from the second lens group through the second quarter-wave plate to the second reflection surface,
wherein the second reflection surface is configured to reflect the first polarized light received from the second quarter-wave plate to the second quarter-wave plate,
wherein the second quarter-wave plate is further configured to transport the first polarized light received from the second reflection surface through the second quarter-wave plate to the second lens group as the second polarized light, wherein the second lens group is further configured to transmit the second polarized light received from the second quarter-wave plate to the polarization splitting subsystem, wherein the polarization splitting subsystem is further configured to reflect the second polarized light onto the second combination subsystem, and wherein the second combination subsystem is configured to:
  combine the second polarized light and incident second external ambient light to obtain combined light and transmit the combined light into the eye.

10. The augmented reality apparatus of claim 9, wherein the second lens group comprises:
  a third subset of lenses configured to converge light; and
  a fourth subset of lenses configured to diverge light.

11. The augmented reality apparatus of claim 9, wherein the polarization splitting subsystem comprises:
  a first polarized light reflection surface;
  a second polarized light reflection surface, wherein the first polarized light reflection surface and the second polarized light reflection surface are symmetrically disposed;
  an input light reflection surface configured to:
    receive the natural light, and
    reflect the natural light
  a third polarization beam splitter, coupled to the input light reflection surface and configured to:
    receive the natural light reflected from the input light reflection surface; and
    split the natural light reflected from the input light reflection surface into first polarized light and the second polarized light,
  wherein the first polarized light reflection surface is configured to reflect and output the first polarized light;
  a fourth polarization beam splitter coupled to the first polarized light reflection surface and configured to reflect the first polarized light to the first image source,
  wherein the first image source is further configured to:
    convert the first polarized light into the second polarized light and
    reflect the second polarized light onto the fourth polarization beam splitter to pass through the fourth polarization beam splitter and to enter to the first optical subsystem,
  wherein the second polarized light reflection surface is configured to reflect and output the second polarized light; and
  a fifth polarization beam splitter coupled to the second polarized light reflection surface and configured to reflect the second polarized light to the second image source,
  wherein the second image source is further configured to:
    convert the second polarized light into the first polarized light; and
    reflect the first polarized light onto the fifth polarization beam splitter to pass through the fifth polarization beam splitter and to enter the second optical subsystem.

12. The augmented reality apparatus of claim 9, wherein the polarization splitting subsystem comprises:
  a sixth polarization beam splitter configured to:
    receive the natural light; and
    reflect the first polarized light in the natural light;
  a seventh polarization beam splitter coupled to the sixth polarization beam splitter and configured to:
    receive the first polarized light reflected from the sixth polarization beam splitter; and
    reflect, to the first image source, the first polarized light received from the sixth polarization beam splitter,
  wherein the first image source is further configured to:
    convert the first polarized light into the second polarized light; and
    transmit the second polarized light through the seventh polarization beam splitter to reach the first optical subsystem;
  an eighth polarization beam splitter; and
  a second reflection plate through coupled to the sixth polarization beam splitter and configured to:
    receive the second polarized light in the natural light from the sixth polarization beam splitter; and
    reflect, to the eighth polarization beam splitter, the second polarized light received from the sixth polarization beam splitter,
  wherein the eighth polarization beam splitter is configured to:
    receive the second polarized light from the second reflection plate; and
    reflects, to the second image source, the second polarized light received from the second reflection plate, and
  wherein the second image source is further configured to:
    convert the second polarized light into the first polarized light; and
    transmit the first polarized light through the eighth polarization beam splitter to reach the second optical subsystem.

13. The augmented reality apparatus of claim 12, wherein the polarization splitting subsystem further comprises a lens group disposed between the sixth polarization beam splitter and the second reflection plate, and wherein the lens group is configured to adjust light field distribution.

14. The augmented reality apparatus of claim 1, further comprising a light homogenization subsystem located between the light-emitting light source and the polarization splitting subsystem and configured to process the natural light from the light-emitting light source into homogeneous mixed-color natural light.

15. The augmented reality apparatus of claim 1, further comprising a beam expansion subsystem located between the light-emitting light source and the polarization splitting subsystem and configured to expand a light spot of the natural light from the light-emitting light source to reach the polarization splitting subsystem.

16. The augmented reality apparatus of claim 1, wherein the first combination subsystem comprises:
  a first beam splitter configured to:
    receive the first polarized light; and
    reflect the first polarized light; and
  a first combination surface coupled to the first beam splitter and configured to:
    receive the first polarized light from the first beam splitter;
    receive the first external ambient light; and
    combine the first polarized light and the first external ambient light to obtain combined light
    project the combined light into the eye after transmitting through the first beam splitter.

17. The augmented reality apparatus of claim 1, wherein the first combination subsystem comprises:
  a waveguider; and
  a second beam splitter coupled to the waveguider and configured to:

receive the first polarized light;
reflect the first polarized light; and
a second combination surface configured to:
receive the first external ambient light;
receive the first polarized light from the second beam splitter; and
combine the first polarized light and the first external ambient light to obtain combined light, and
wherein the waveguider is configured to:
receive after the combined light enters the first waveguider through the second beam splitter; and
transmit the combined light through the waveguider and project into the eye.

18. An optical engine component applied to an augmented reality product, wherein the optical engine component comprises:
a first image source;
a first optical subsystem comprising:
a first lens group;
a first quarter-wave plate; and
a first reflection surface;
a light-emitting light source configured to emit natural light;
a polarization splitting subsystem coupled to the light-emitting light source and configured to:
receive the natural light
reflect first polarized light in the natural light; and
transmit the first polarized light to the first image source,
wherein the first image source is configured to:
convert the first polarized light into second polarized light; and
transmit the second polarized light to the polarization splitting subsystem,
wherein the polarization splitting subsystem is further configured to transport the second polarized light,
wherein the first lens group is configured to:
receive the second polarized light from the polarization splitting subsystem; and
transmit the second polarized light through the first lens group to the first quarter-wave plate,
wherein the first quarter-wave plate is configured to:
receive the second polarized light from the first lens group; and
transport the second polarized light through the first quarter-wave plate to the first reflection surface,
wherein the first reflection surface is configured to:
receive the second polarized light from the first quarter-wave plate; and
reflect the second polarized light onto the first quarter-wave plate,
wherein the first quarter-wave plate is further configured to:
receive the second polarized light reflected from the first reflection surface; and
transport the second polarized light through the first quarter-wave plate to the first lens group as the first polarized light; and
wherein the first lens group is further configured to:
receive the first polarized light from the first quarter-wave plate; and
transmit the first polarized light the polarization splitting subsystem, and
wherein the polarization splitting subsystem is further configured to reflect the first polarized light.

19. An augmented reality method comprising:
emitting, by a light-emitting light source, natural light;
reflecting, by a polarization splitting subsystem, first polarized light in the natural light to enter a first image source;
converting, by the first image source, the first polarized light into second polarized light
transmitting, by the first image source, the second polarized light to the polarization splitting subsystem;
transporting, by the polarization splitting subsystem, the second polarized light to a first lens group;
transmitting, by the first lens group, the second polarized light through the first lens group to a first quarter-wave plate;
processing, by the first quarter-wave plate, the second polarized light into third polarized light;
transporting, by the first quarter-wave plate, the third polarized light to a first reflection surface;
reflecting, by the first reflection surface, the third polarized light to the first quarter-wave plate;
processing, by the first quarter-wave plate, the third polarized light into the first polarized light;
transporting, by the first quarter-wave plate, the first polarized light to the first lens group;
transmitting, by the first lens group, the first polarized light to the polarization splitting subsystem;
reflecting, by the polarization splitting subsystem, the first polarized light to enter to a first combination subsystem; and
combining, by the first combination subsystem, the first polarized light and incident first external ambient light to obtain combined light to project into an eye.

20. The augmented reality method of claim 19, further comprising:
reflecting, by the polarization splitting subsystem, the second polarized light in the natural light to enter to a second image source;
converting, by the second image source, the second polarized light into the first polarized light;
transmitting, by the second image source, the first polarized light to the polarization splitting subsystem;
transporting, by the polarization splitting subsystem, the first polarized light to a second lens group;
transmitting, by the second lens group, the first polarized light through the second lens group to a second quarter-wave plate;
processing, by the second quarter-wave plate, the first polarized light into the third polarized light;
transporting, by the second quarter-wave plate, the third polarized light to a second reflection surface;
reflecting, by the second reflection surface, the third polarized light to the second quarter-wave plate;
processing, by the second quarter-wave plate, the third polarized light into the second polarized light;
transporting, by the second quarter-wave plate, the second polarized light to the second lens group;
transmitting, by the second lens group, the second polarized light to the polarization splitting subsystem;
reflecting, by the polarization splitting subsystem, the second polarized light to enter to a second combination subsystem; and
combining, by the second combination subsystem, the second polarized light and incident second external ambient light to obtain the combined light to project into the eye.

* * * * *

UNITED STATES PATENT AND TRADEMARK OFFICE
CERTIFICATE OF CORRECTION

PATENT NO. : 11,269,186 B2
APPLICATION NO. : 16/891671
DATED : March 8, 2022
INVENTOR(S) : Fei et al.

It is certified that error appears in the above-identified patent and that said Letters Patent is hereby corrected as shown below:

In the Claims

Claim 1, Column 29, Line 49: "natural light and" should read "natural light; and"

Claim 9, Column 33, Line 11: "light and" should read "light; and"

Claim 11, Column 33, Line 26: "natural light, and" should read "natural light; and"

Claim 11, Column 33, Line 27: "natural light" should read "natural light;"

Claim 11, Column 33, Line 28: "splitter, coupled" should read "splitter coupled"

Claim 11, Column 33, Line 42: "light and" should read "light; and"

Claim 16, Column 34, Line 60: "light" should read "light;"

Claim 17, Column 35, Lines 10-11: "receive after the combined light enters the first waveguider through the" should read "receive the combined light through the"

Claim 18, Column 35, Line 27: "natural light" should read "natural light;"

Claim 19, Column 36, Line 7: "polarized light" should read "polarized light;"

Signed and Sealed this
Seventeenth Day of May, 2022

*Katherine Kelly Vidal*

Katherine Kelly Vidal
*Director of the United States Patent and Trademark Office*